United States Patent
Lee et al.

(10) Patent No.: US 11,894,692 B2
(45) Date of Patent: Feb. 6, 2024

(54) WIRELESS POWER RECEIVING DEVICE, WIRELESS POWER TRANSMITTING DEVICE, AND CONTROL METHOD THEREFOR

(71) Applicant: SAMSUNG ELECTRONICS CO., LTD., Suwon-si (KR)

(72) Inventors: Sangwook Lee, Suwon-si (KR); Chongmin Lee, Suwon-si (KR); Daehyun Kim, Suwon-si (KR); Jaeseok Park, Suwon-si (KR); Hyoseok Han, Suwon-si (KR); Seunghyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/267,996

(22) PCT Filed: Aug. 14, 2019

(86) PCT No.: PCT/KR2019/010392
§ 371 (c)(1),
(2) Date: Feb. 11, 2021

(87) PCT Pub. No.: WO2020/036448
PCT Pub. Date: Feb. 20, 2020

(65) Prior Publication Data
US 2021/0320530 A1    Oct. 14, 2021

(30) Foreign Application Priority Data
Aug. 14, 2018    (KR) .......................... 10-2018-0094918

(51) Int. Cl.
*H02J 50/20*    (2016.01)
*H02J 50/80*    (2016.01)
(Continued)

(52) U.S. Cl.
CPC .............. *H02J 50/20* (2016.02); *H02J 50/40* (2016.02); *H02J 50/80* (2016.02); *H02J 50/90* (2016.02)

(58) Field of Classification Search
CPC .. H02J 50/20; H02J 50/40; H02J 50/80; H02J 50/90; H02J 50/402; H02J 50/23; H02J 50/50
See application file for complete search history.

(56) References Cited

U.S. PATENT DOCUMENTS 9,859,756 B2 *    1/2018    Leabman .............. H04B 5/0037
10,116,170 B1 *    10/2018    Leabman ................ H02J 50/20
(Continued)

FOREIGN PATENT DOCUMENTS

KR    10-2011-0069638    6/2011
KR    10-2012-0037965    4/2012
(Continued)

OTHER PUBLICATIONS

International Search Report for PCT/KR2019/010392, dated Nov. 25, 2019, 4 pages.
(Continued)

*Primary Examiner* — Daniel Kessie
*Assistant Examiner* — Brian K Baxter
(74) *Attorney, Agent, or Firm* — Nixon & Vanderhye, P.C.

(57) ABSTRACT

A wireless power receiving device, according to the disclosure, comprises: at least one power receiving antenna for sequentially receiving a plurality of different RF waves formed by a wireless power transmitting device; a communication circuit; and at least one processor, wherein the at least one processor is configured to confirm a plurality of pieces of strength information that indicates the strength of each of the plurality of different RF waves, confirm a
(Continued)

plurality of pieces of phase information corresponding to each of the plurality of different RF waves, confirm, on the basis of the plurality of pieces of strength information and the plurality of pieces of phase information, an optimum phase value such that a received RF wave has a maximum strength, and transmit a communication signal including information about the optimum phase value to the wireless power transmitting device through the communication circuit. Additional various embodiments are possible.

10 Claims, 16 Drawing Sheets

(51) Int. Cl.
   *H02J 50/90* (2016.01)
   *H02J 50/40* (2016.01)

(56) References Cited

U.S. PATENT DOCUMENTS

| | | | |
|---|---|---|---|
| 10,263,432 B1* | 4/2019 | Leabman | H02J 50/402 |
| 10,291,066 B1* | 5/2019 | Leabman | H02J 50/20 |
| 10,469,132 B2* | 11/2019 | Lee | H04W 36/08 |
| 11,011,941 B2* | 5/2021 | Abiri | H02J 50/27 |
| 2007/0153561 A1* | 7/2007 | Mickle | H02J 50/402 |
| | | | 340/10.34 |
| 2008/0309452 A1 | 12/2008 | Zeine | |
| 2013/0059619 A1 | 3/2013 | Kim et al. | |
| 2016/0064943 A1 | 3/2016 | Ku et al. | |
| 2016/0064994 A1* | 3/2016 | Ku | H02J 50/402 |
| | | | 307/104 |
| 2017/0085112 A1* | 3/2017 | Leabman | H02J 50/80 |
| 2017/0085126 A1* | 3/2017 | Leabman | H02J 50/80 |
| 2017/0085127 A1* | 3/2017 | Leabman | H02J 50/80 |
| 2017/0237296 A1 | 8/2017 | Keith et al. | |
| 2017/0288475 A1* | 10/2017 | Lee | H04W 8/005 |
| 2017/0331330 A1 | 11/2017 | Yeo et al. | |
| 2017/0331332 A1* | 11/2017 | Lee | H02J 50/20 |
| 2018/0131975 A1 | 5/2018 | Badawiyeh et al. | |
| 2018/0132090 A1 | 5/2018 | Takano | |
| 2018/0132261 A1 | 5/2018 | Zhang et al. | |
| 2018/0183259 A1* | 6/2018 | Lee | H02J 50/90 |

FOREIGN PATENT DOCUMENTS

| | | |
|---|---|---|
| KR | 10-2013-0025102 | 3/2013 |
| KR | 10-1350309 | 1/2014 |
| KR | 10-2016-0028365 | 3/2016 |
| KR | 10-2017-0100649 | 9/2017 |
| KR | 10-2017-0128052 | 11/2017 |
| KR | 10-2018-0074425 | 7/2018 |

OTHER PUBLICATIONS

Written Opinion of the ISA for PCT/KR2019/010392, dated Nov. 25, 2019, 7 pages.
Office Action dated Apr. 5, 2023 in Korean Patent Application No. 10-2018-0094918 and English-language translation.
Office Action dated Aug. 30, 2003 in counterpart Korean Patent Application No. 10-2018-0094918 and English-language translation.

* cited by examiner

WIRELESS POWER RECEIVING DEVICE, WIRELESS POWER TRANSMITTING DEVICE, AND CONTROL METHOD THEREFOR

CROSS-REFERENCE TO RELATED APPLICATION(S)

This application is a National Phase Entry of PCT International Application No. PCT/KR2019/010392, which was filed on Aug. 14, 2019 and claims priority to Korean Patent Application No. 10-2018-0094918, which was filed on Aug. 14, 2018 in the Korean Intellectual Property Office, the contents of which are incorporated herein by reference.

BACKGROUND

1. Field

The disclosure relates to a wireless power reception device, a wireless power transmission device, and a control method therefor, and more particularly to a wireless power reception device, a wireless power transmission device, and a control method therefor for performing power transmission and reception using an RF wave.

2. Description of the Related Art

For many people living in modern times, portable digital communication devices have become essential elements. Consumers want to be provided with a variety of high-quality services anytime and anywhere. Due to the recent development of technology related to the Internet of Things (IoT), various sensors, home appliances, and communication devices already present in our daily lives are being united into one network. In order to smoothly operate these various sensors, a wireless power transmission system is required.

Wireless power transmission methods include magnetic-induction, magnetic-resonance, and electromagnetic-wave methods, among which the electromagnetic-wave method is advantageous for long-distance power transmission compared to the other methods.

The electromagnetic-wave method is mainly used for long-distance power transmission, in which it is crucial to identify the exact location of a power receiver from a long distance in order to transmit power most efficiently.

SUMMARY

In a conventional electromagnetic-wave method, in order to determine the location of an object to be charged, for example, an electronic device, a wireless power transmission device may employ a method of forming radio-frequency (RF) waves in a plurality of directions, receiving information about power reception from the electronic device (the wireless power reception device) in response thereto, and determining the location of the electronic device based on the information. However, it takes a long time for the wireless power transmission device to receive a plurality of pieces of information about power reception from the wireless power reception device in response to a plurality of respective RF waves formed in the plurality of directions.

Various embodiments of the disclosure may provide a wireless power reception device, a wireless power transmission device, and a control method therefor which enable a reduction in the amount of time taken for the wireless power transmission device to receive information about power reception by the wireless power reception device transmitting a single piece of information about power reception in relation to a plurality of RF waves formed in a plurality of directions.

According to various embodiments, there may be provided a wireless power reception device including: at least one power reception antenna configured to sequentially receive a plurality of different RF waves formed by a wireless power transmission device; a communication circuit; and at least one processor, wherein the at least one processor is configured to: identify a plurality of pieces of strength information indicating respective strengths of the plurality of different RF waves; identify a plurality of pieces of phase information corresponding to respective ones among the plurality of different RF waves; identify, based on the plurality of pieces of strength information and the plurality of pieces of phase information, an optimum phase value allowing a received RF wave to have a maximum strength; and transmit a communication signal including information about the optimum phase value to the wireless power transmission device through the communication circuit.

According to various embodiments, there may be provided a wireless power transmission device including: at least one power transmission antenna configured to sequentially transmit a plurality of different RF waves; a communication circuit; and at least one processor, wherein the at least one processor is configured to receive a communication signal including information about an optimum phase value from a wireless power reception device through the communication circuit, and the optimum phase value is identified based on a plurality of pieces of strength information indicating respective strengths of the plurality of different RF waves and a plurality of pieces of phase information corresponding to respective ones among the plurality of different RF waves, which are identified by the wireless power reception device.

According to various embodiments, there may be provided a wireless power reception device including: at least one power reception antenna configured to sequentially receive a plurality of different RF waves formed by a wireless power transmission device; a communication circuit; and at least one processor, wherein the at least one processor is configured to: identify a plurality of pieces of strength information indicating respective strengths of the plurality of different RF waves; and transmit a communication signal including at least one of the plurality of pieces of identified strength information to the wireless power transmission device through the communication circuit.

Technical solutions according to various embodiments are not limited to the technical solutions mentioned above, and other technical solutions not mentioned will be clearly understood by those skilled in the art to which the disclosure pertains based on the following description and the appended drawings.

Various embodiments of the disclosure may provide a wireless power reception device, a wireless power transmission device, and a control method therefor which enable a reduction in the amount of time taken for the wireless power transmission device to receive information about power reception by the wireless power reception device transmitting a single piece of information about power reception in relation to a plurality of RF waves formed in a plurality of directions. In addition, according to various embodiments of the disclosure, the wireless power transmission device may receive an optimum phase value calculated by the wireless power reception device from the wireless power reception device, thereby reducing the amount of time taken for the wireless power transmission device to configure the optimum phase of the RF waves.

DETAILED DESCRIPTION

Figure 1:
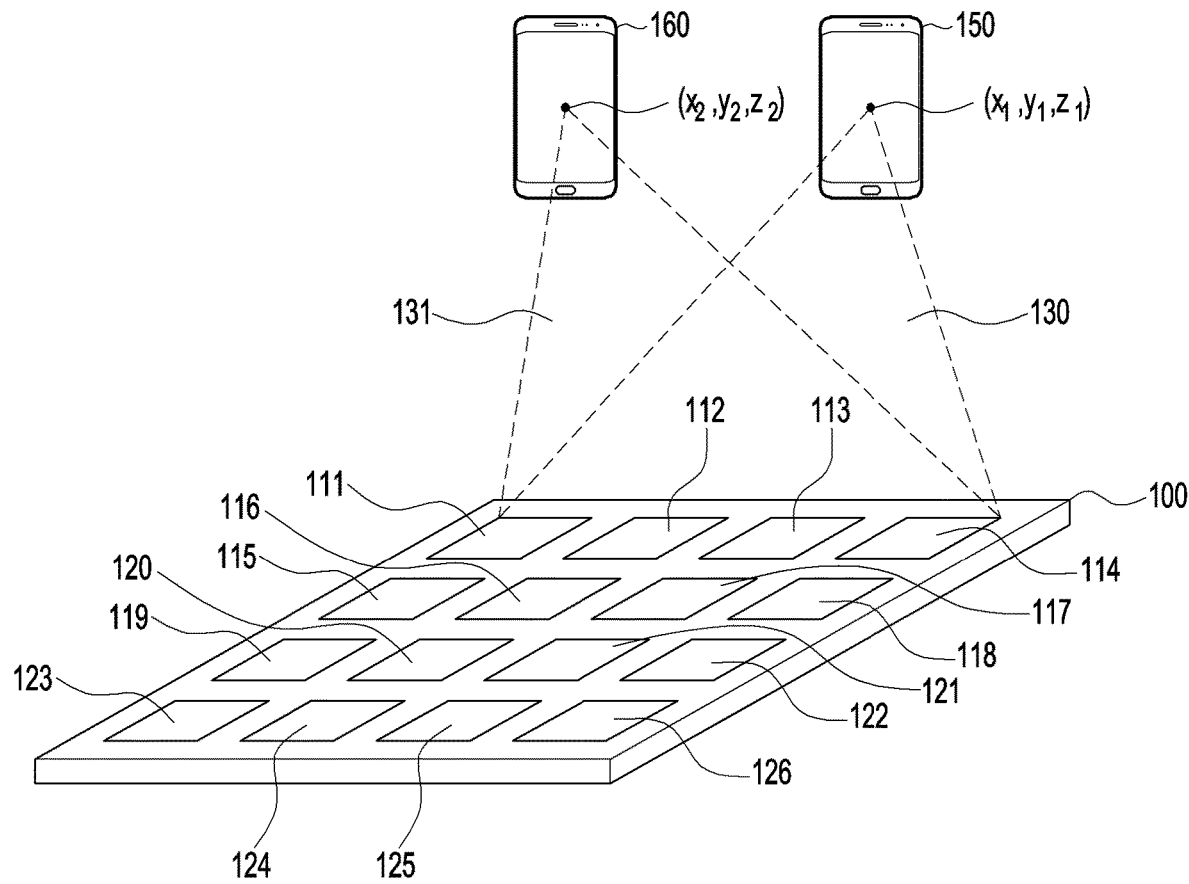
FIG. 1 is a conceptual diagram illustrating a wireless power transmission system according to various embodiments of the disclosure.

Hereinafter, various embodiments of the disclosure will be described with reference to the accompanying drawings. It should be appreciated that the embodiments and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, such phrases as "A or B" and "at least one of A and/or B" may include all possible combinations of the items enumerated together in the corresponding phrase. As used herein, such terms as "a first", "a second", "the first", and "the second" may modify corresponding elements regardless of the order and/or the importance thereof. These terms may be used to simply distinguish a corresponding element from another, and does not limit the elements. It should be understood that when an element (e.g., first element) is referred to as being (operatively or communicatively) "connected" or "coupled" to another element (e.g., second element), it means that the element may be coupled with the other element directly or via another element (e.g., third element).

The expression "configured to" used in the disclosure may be interchangeably used with, for example, "suitable for", "having the capacity to", "adapted to", "made to", "capable of", or "designed to" in hardware or software. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

A wireless power transfer device or electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit). According to some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a media box, a game console, an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). According to some embodiments, the wireless power transfer device or electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the wireless power transfer device or electronic device may be flexible, or may be a combination of one or more of the aforementioned various devices. The electronic device according to various embodiments of the disclosure is not limited to the aforementioned devices. In the disclosure, the term "user" may refer to a person using an electronic device or a device (e.g., artificial intelligence electronic device) using an electronic device.

FIG. 1 is a conceptual diagram illustrating a wireless power transmission system according to various embodiments of the disclosure.

A wireless power transmission device 100 may wirelessly transmit power to at least one electronic device 150 and 160. In various embodiments of the disclosure, the wireless power transmission device 100 may include a plurality of patch antennas 111 to 126. The plurality of patch antennas 111 to 126 is not limited, as long as each of the antennas can generate RF waves. For example, the plurality of patch antennas 111 to 126 may be configured as a plurality of patch antennas disposed in the same plane, as shown in FIG. 1, but may alternatively be configured as a plurality of patch antennas provided in various arrangements and different numbers, without being limited to the illustrated arrangement, number, and antenna type, and may also be configured as a plurality of dipole antennas, a plurality of monopole antennas, a plurality of parabolic antennas, or the like. At least one of the amplitude and phase of RF waves generated by the plurality of patch antennas 111 to 126 may be adjusted by the wireless power transmission device 100. For convenience of description, an RF wave generated by each of the patch antennas 111 to 126 is referred to as a sub-RF wave.

In various embodiments of the disclosure, the wireless power transmission device 100 may adjust at least one of the amplitude and the phase of individual sub-RF waves generated by the patch antennas 111 to 126. The sub-RF waves may interfere with each other. For example, the sub-RF waves may constructively interfere with each other at one point, while the sub-RF waves may destructively interfere with each other at another point. The wireless power transmission device 100 according to various embodiments of the disclosure may adjust at least one of the amplitude and phase of the individual sub-RF waves generated by the patch antennas 111 to 126 so that the sub-RF waves may constructively interfere with each other at a first point (x1, y1, z1).

For example, the wireless power transmission device 100 may determine that the electronic devices 150 and 160 are disposed at the first point (x1, y1, z1). Here, the position of the electronic devices 150 and 160 may be, for example, a point where power reception antennas of the electronic devices 150 and 160 are positioned. The configuration used by the wireless power transmission device 100 to determine the position of the electronic devices 150 and 160 will be described in detail later. For the electronic devices 150 and 160 to wirelessly receive power with high transmission efficiency, the sub-RF waves need to constructively interfere with each other at the first point (x1, y1, z1). Accordingly, the wireless power transmission device 100 may control the patch antennas 111 to 126 so that the sub-RF waves constructively interfere with each other at the first point (x1, y1, z1). Controlling the patch antennas 111 to 126 may mean controlling the strength of a signal input to the patch antennas 111 to 126 or controlling the phase (or delay) of a signal input to the patch antennas 111 to 126. Beam forming, which is a technique for controlling RF waves to constructively interfere at a specific point, will be easily understood by those skilled in the art. In addition, it will be easily understood by those skilled in the art that there is no limitation as to the type of beamforming used in the disclosure. For example, various beamforming methods, such as those disclosed in US Patent Publication No. 2016/0099611, US Patent Publication No. 2016/0099755, US Patent Publication No. 2016/0100124, and the like, may be used. The form of an RF wave formed by beamforming may also be referred to as a pocket of energy.

An RF wave 130 formed by the sub-RF waves may have a maximum amplitude at the first point (x1, y1, z1), and accordingly the electronic device 150 may receive wireless power with high efficiency. The wireless power transmission device 100 may detect that the electronic device 160 is disposed at a second point (x2, y2, z2). The wireless power transmission device 100 may control the patch antennas 111 to 126 so that the sub-RF waves constructively interfere at the second point (x2, y2, z2) to charge the electronic device 160. Accordingly, an RF wave 131 formed by the sub-RF waves may have a maximum amplitude at the second point (x2, y2, z2), and accordingly the electronic device 160 may receive wireless power with high transmission efficiency.

In detail, the electronic devices 150 and 160 may be disposed relatively to the right. In this case, the wireless power transmission device 100 may apply a relatively large delay to sub-RF waves formed by patch antennas (e.g., 114, 118, 122, and 126) disposed relatively to the right. That is, sub-RF waves formed by patch antennas (e.g., 111, 115, 119, and 123) disposed relatively to the left may be formed first, and then, after a lapse of a predetermined time, the sub-RF waves may be generated by the patch antennas (e.g., 114, 118, 122, and 126) disposed relatively to the right. Accordingly, the sub-RF waves may simultaneously meet at a relatively rightward point, that is, the sub-RF waves may constructively interfere at the relatively rightward point. When beamforming is performed at a relatively central point, the wireless power transmission device 100 may apply substantially the same delay to the left patch antennas (e.g., 111, 115, 119, and 123) and the right patch antennas (e.g., 114, 118, 122, and 126). Further, when beamforming is performed at a relatively leftward point, the wireless power transmission device 100 may apply a delay larger than that applied to the right patch antennas (e.g., 114, 118, 122, and 126) to the left patch antennas (e.g., 111, 115, 119, and 123). In another embodiment, the wireless power transmission device 100 may oscillate the sub-RF waves substantially simultaneously across the patch antennas 111 to 126, and may adjust the phase corresponding to a delay described above, thereby performing beamforming.

As described above, the wireless power transmission device 100 may determine the positions of the electronic devices 150 and 160 and may allow the sub-RF waves to constructively interfere at the determined positions, thereby performing wireless charging with high transmission efficiency. The wireless power transmission device 100 needs to accurately identify the positions of the electronic devices 150 and 160 in order to be capable of performing wireless charging with high transmission efficiency.

Figure 2:
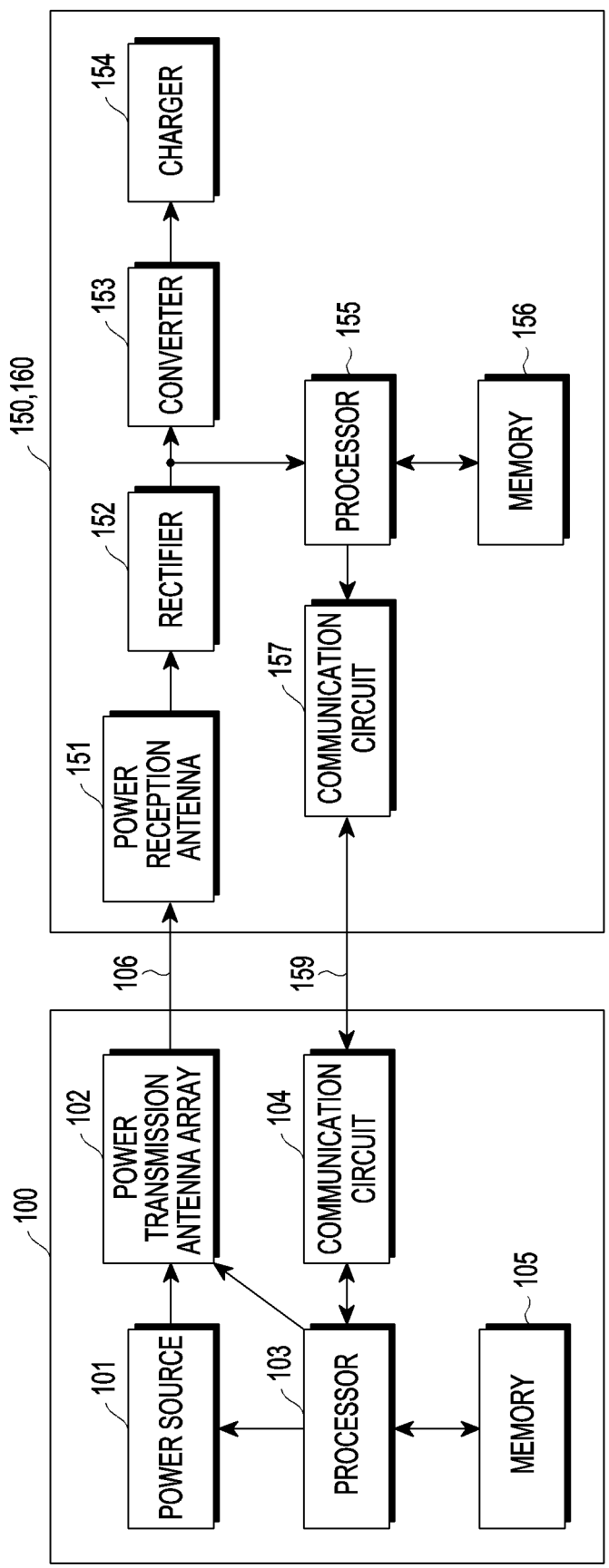
FIG. 2 is a block diagram illustrating a wireless power transmission device according to various embodiments of the disclosure.

FIG. 2 is a block diagram illustrating a wireless power transmission device according to various embodiments of the disclosure.

Referring to FIG. 2, the wireless power transmission device 100 may include a power source 101, a power transmission antenna array 102, a processor 103, a communication circuit 104, and a memory 105. Referring to FIG. 2, an electronic device 150 and 160 is not limited, as long as the electronic device wirelessly receives power, and may include a power reception antenna 151, a rectifier 152, a converter 153, a charger 154, a processor 155, a memory 156, and a communication circuit 157.

The power source 101 may provide power for transmission to the power transmission antenna array 102. The power source 101 may provide, for example, DC power, in which case an inverter (not shown) that converts DC power into AC power and transmits the AC power to the power transmission antenna array 102 may be further included in the wireless power transmission device 100. In another embodiment, the power source 101 may provide AC power to the power transmission antenna array 102.

The power transmission antenna array 102 may include a plurality of patch antennas. For example, the plurality of patch antennas 111 to 126 illustrated in FIG. 1 may be included in the power transmission antenna array 102. There is no limitation on the number or arrangement of the plurality of patch antennas. The power transmission antenna array 102 may form an RF wave using power provided from the power source 101. The power transmission antenna array 102 may form an RF wave in a specific direction under the control of the processor 103. Forming an RF wave in a specific direction may mean controlling at least one of the amplitude and the phase of sub-RF waves such that the sub-RF waves constructively interfere at one point in the specific direction.

The processor 103 may control the power transmission antenna array 102 to form a sub-RF wave in each of a plurality of directions. The memory 130 may store a program or an algorithm for generating a sub-RF wave, that is, a pilot signal, in each of the plurality of directions. The processor 103 may control at least one of the phase and amplitude of each patch antenna of the power transmission antenna array 610 using the program or algorithm stored in the memory 130.

The processor 103 may determine the direction in which the electronic device 150 and 160 is positioned, and may determine the direction in which an RF wave is formed based on the determined direction. That is, the processor 103 may control the patch antennas of the power transmission antenna array 102 that generate sub-RF waves so that the sub-RF waves cause constructive interference at a point in the determined direction. For example, the processor 103 may control the patch antennas or a control device connected to the patch antennas, thereby controlling at least one of the amplitude and phase of a sub-RF wave generated from each of the patch antennas.

The processor 103 may control the power transmission antenna array 102 based on the direction of the electronic device 150 and 160, thereby forming an RF wave in the direction of the electronic device 150 and 160. The processor 103 may identify the electronic device 150 and 160 using information in a communication signal 159. The communication signal 159 may include a unique identifier or a unique address of the electronic device. The communication circuit 104 may process the communication signal 159, and may provide the information to the processor 103. The communication circuit 104 and a communication antenna (not shown) may be produced based on various communication methods, such as wireless fidelity (Wi-Fi), Bluetooth, ZigBee, near-field communication (NFC), Bluetooth Low Energy (BLE), and the like, and there is no limitation on the type of communication method. The communication signal 159 may include rated power information about the electronic device 150 and 160, and the processor 103 may determine whether to charge the electronic device 150 and 160 based on at least one of the unique identifier, the unique address, and the rated power information of the electronic device 150 and 160.

The communication signal may also be used in a process in which the wireless power transmission device 100 identifies the electronic device 150 and 160, a process in which the wireless power transmission device 100 allows power transmission to the electronic devices 150 and 160, a process in which the wireless power transmission device 100 requests information about reception power from the electronic device 150 and 160, a process in which the wireless power transmission device 100 receives the information about reception power from the electronic device 150 and 160, and the like. That is, the communication signal may be used in an admission, command, or request process between the wireless power transmission device 100 and the electronic device 150 and 160.

The processor 103 may control the power transmission antenna array 102 to form the RF wave 106 in the determined direction of the electronic devices 150 and 160. The processor 103 may form a RF wave for detection and may then determine the distance to the electronic device 150 and 160 using a different communication signal received as feedback. For example, the different communication signal may include a time stamp at a transmission time thereof. The processor 103 may determine the distance to the electronic device 150 and 160 by comparing the time stamp included in the different communication signal with the reception time.

Accordingly, the processor 103 may determine both the direction of the electronic device 150 and 160 and the distance to the electronic device 150 and 160, and may eventually determine the position of the electronic device 150 and 160. The processor 103 may control the patch antennas so that sub-RF waves generated by the patch antennas constructively interfere with each other at the position of the electronic device 150 and 160. Accordingly, the RF wave 106 may be transmitted to the power reception antenna 151 with relatively high transmission efficiency.

The power reception antenna 151 is not limited, as long as the power reception antenna is an antenna capable of receiving an RF wave. In addition, the power reception antenna 151 may also be configured in the form of an array including a plurality of antennas. AC power received by the power reception antenna 151 may be rectified into DC power by the rectifier 152. The converter 153 may convert DC power into a required voltage and may provide the voltage to the charger 154. The charger 154 may charge a battery (not shown). Although not shown, the converter 153 may provide converted power to a power management integrated circuit (PMIC, not shown), and the PMIC (not shown) may provide power to various types of hardware of the electronic device 150 and 160.

The communication circuit 157 may transmit the communication signal 159 including identification information about the electronic device 150 and 160 to the wireless power transmission device 100. The memory 156 may store a program or algorithm for controlling the various types of hardware of the electronic device 150 and 160.

The processor 155 may monitor the voltage of an output terminal of the rectifier 152. For example, a voltmeter connected to the output terminal of the rectifier 152 may be further included in the electronic devices 150 and 160, and the processor 155 may receive a voltage value from the voltmeter to monitor the voltage at the output terminal of the rectifier 152. The processor 155 may provide information including the voltage value of the output terminal of the rectifier 152 to the communication circuit 157. The communication circuit 157 may transmit a communication signal including reception-power-related information using the communication antenna (not shown). The reception-power-related information may be information about the level of received power, for example, the voltage of the output terminal of the rectifier 152, and may include the level of a current of the output terminal of the rectifier 152. In this case, it will be easily understood by those skilled in the art that an ammeter for measuring the current of the output terminal of the rectifier 152 or a voltmeter may be further included in the electronic device 150 and 160. The ammeter may be configured in various forms, such as a DC ammeter, an AC ammeter, and a digital ammeter, without being limited in type. The voltmeter may be configured in various forms, such as an electrodynamic voltmeter, an electrostatic voltmeter, and a digital voltmeter, without being limited in type. In addition, the position at which the reception-power-related information is measured includes not only the output terminal of the rectifier 152 but also any point on the electronic device 150 and 160, and is not limited.

The processor 155 may calculate an optimum phasor of a sub-RF wave received from the wireless power transmission device. The processor may provide information about the calculated optimum phasor to the communication circuit 157 and may transmit the information about the optimum phasor to the wireless power transmission device through the communication circuit 157 using the communication antenna (not shown). The wireless power transmission device may configure the phase of the sub-RF wave transmitted to the electronic device 150 and 160 based on the received information about the optimum phasor. The operation of the electronic device 150 and 160 (e.g., the processor 155) calculating the optimum phasor value as described above may reduce the amount of time taken for the wireless power transmission device to configure the phase of a sub-RF wave. That is, the time spent by the electronic device 150 and 160 waiting for wireless power reception may be reduced.

Figure 3:
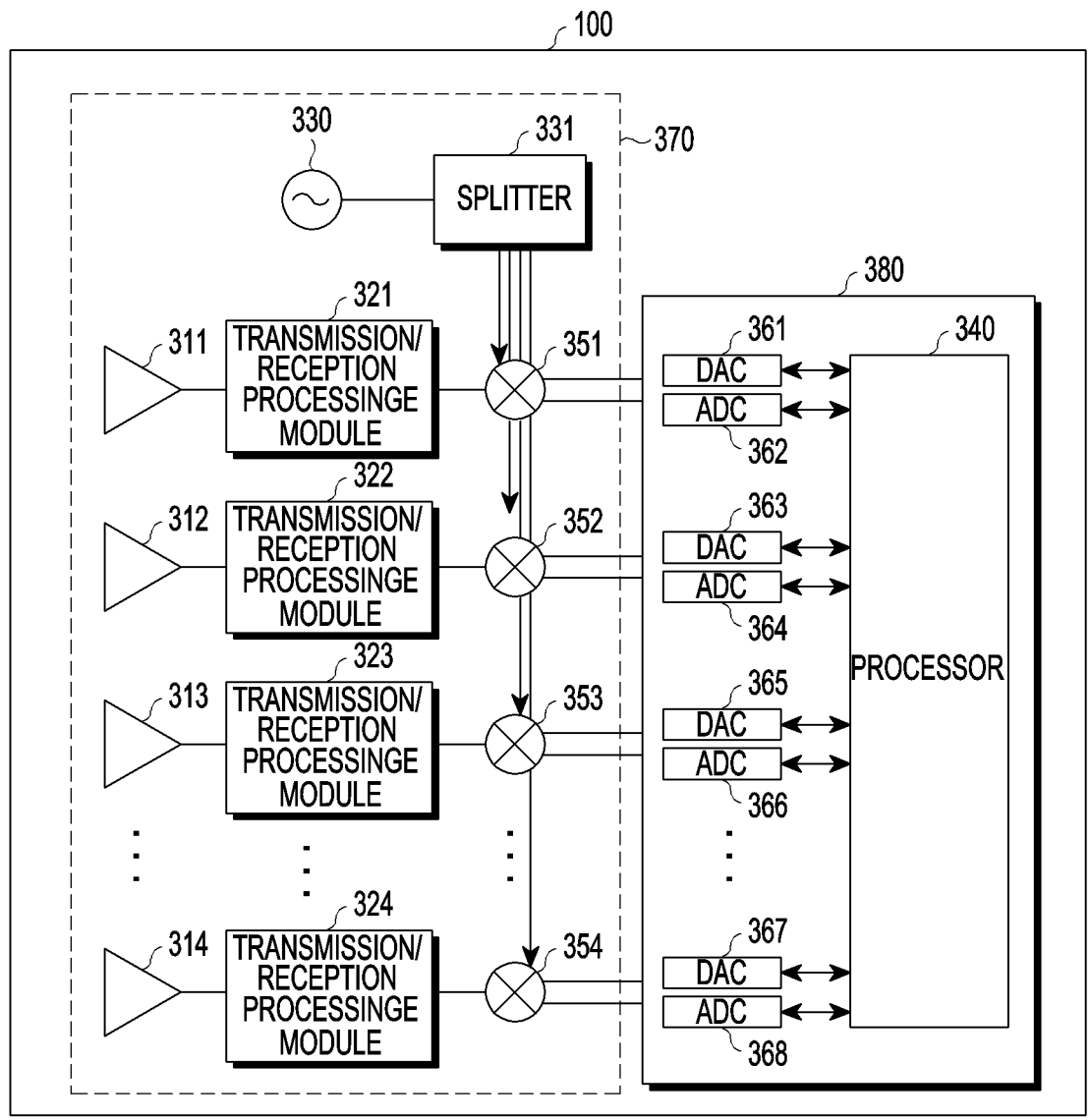
FIG. 3 is a conceptual diagram illustrating a modification of the configuration of a wireless power transmission device according to various embodiments of the disclosure.

FIG. 3 is a conceptual diagram illustrating a modification of the configuration of a wireless power transmission device according to various embodiments of the disclosure.

A transmitter 370 may include patch antennas 311 to 314, an oscillator 330, transmission/reception processing modules 321 to 324, and mixers 351 to 354, and a processor unit 380 may include a processor 340, digital-to-analog converters (DACs) 361, 363, 365, and 367, and analog-to-digital converters (ADCs) 362, 364, 366, and 368.

The oscillator 330 may provide an AC waveform signal to a splitter 331. The splitter 331 may split the provided signal by the number of patch antennas 311 to 314. The splitter 331 may transmit each split signal to each of the mixers 351 to 354. Each signal from the splitter 331 may be provided to a corresponding one of the transmission/reception processing modules 321 to 324 through a corresponding one of the mixers 351 to 354.

Each of the transmission/reception processing modules 321 to 324 may process the received signal and provide the signal to a corresponding one of the antennas 311 to 314. In various embodiments of the disclosure, the transmission/reception processing modules 321 to 324 may adjust the phase of the provided signal, that is, may apply a delay to the signal. Alternatively, the transmission/reception processing modules 321 to 324 may adjust the amplitude of the provided signal. Each of the transmission/reception processing modules 321 to 324 may adjust at least one of the phase and amplitude of the signal according to control of the processor 340, and the processor 340 may control each of the transmission/reception processing modules 321 to 324 to adjust at least one of the phase and amplitude of the signal so that the signal is beamformed at a specific point. In detail, each of the transmission/reception processing modules 321 to 324 may adjust the phase to a different extent, and accordingly, a sub-RF wave may be oscillated by each of the patch antennas 311 to 314 at a different time, and beamforming may be performed for a specific point or in a specific direction.

The processor 340 may further provide additional information, and the additional information may be mixed with the signal from the splitter 331 by each of the mixers 351 to 354. The additional information may be converted into an analog form by the digital-to-analog converters (DACs) 361, 363, 365, and 367 and may be provided to each of the mixers 351 to 354. The mixers 351 to 354 may modulate a signal from the oscillator 330 and may output the signal to the transmission/reception processing modules 321 to 324. Alternatively, the mixers 351 to 354 may convert a signal output from the transmission/reception processing modules 321 to 324 into information through the analog-to-digital converters (ADCs) 362, 364, 366, and 368 and may output the information to the processor 340.

The patch antennas 311 to 314 may correspond to the patch antennas 111 to 126 described above, respectively. The patch antennas 311 to 314 may form sub-RF waves using the signals provided from the transmission/reception processing modules 321 to 324, respectively. An RF wave resulting from interference between the sub-RF waves, that is, a transmission wave 391, may be oscillated from the patch antennas 311 to 314. The transmission wave 391 may be oscillated during a first period. That is, the oscillator 330 may provide power to the splitter 331 during the first period, the transmission/reception processing modules 321 to 324 may respectively process the provided signals to form the transmission wave 391, and the patch antennas 311 to 314 may respectively form the sub-RF waves using the provided signals. The mode in which the patch antennas 311 to 314 form the sub-RF waves using the signals provided during the first period is referred to as a transmission mode.

Accordingly, the wireless power transmission device 100 configured as described above may transmit predetermined information via sub-RF waves without an additional separate communication circuit.

Hereinafter, operations of an electronic device 150 and 160 and a wireless power transmission device 100 for calculating and configuring an optimum phase value will be described.

According to various embodiments, the electronic device 150 and 160 receives an RF wave from the wireless power transmission device 100, and may thus be referred to as a wireless power reception device for convenience of description.

According to various embodiments, a plurality of patch antennas of the wireless power transmission device may be configured in various arrangements, forms, and types of antennas as described above, and may thus be comprehensively termed antennas. That is, among N patch antennas of the wireless power transmission device described above, a first patch antenna may be referred to as a first antenna, a second patch antenna may be referred to as a second antenna, . . . , and an Nth patch antenna may be referred to as an Nth antenna.

Figure 4:
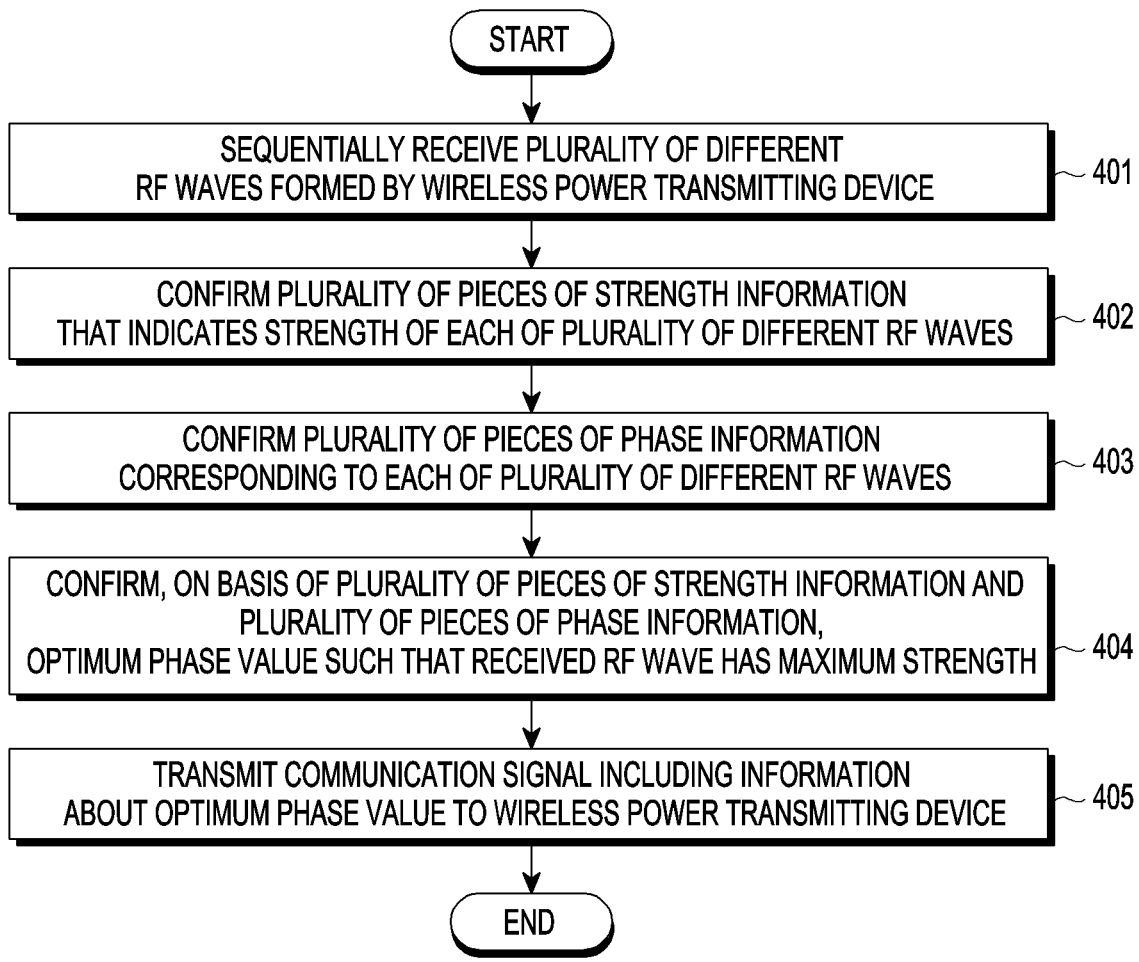
FIG. 4 is a flowchart illustrating a series of operations of a wireless power reception device according to various embodiments of the disclosure.

FIG. 4 is a flowchart illustrating a series of operations of the wireless power reception device 150 and 160 according to various embodiments.

Figure 5:
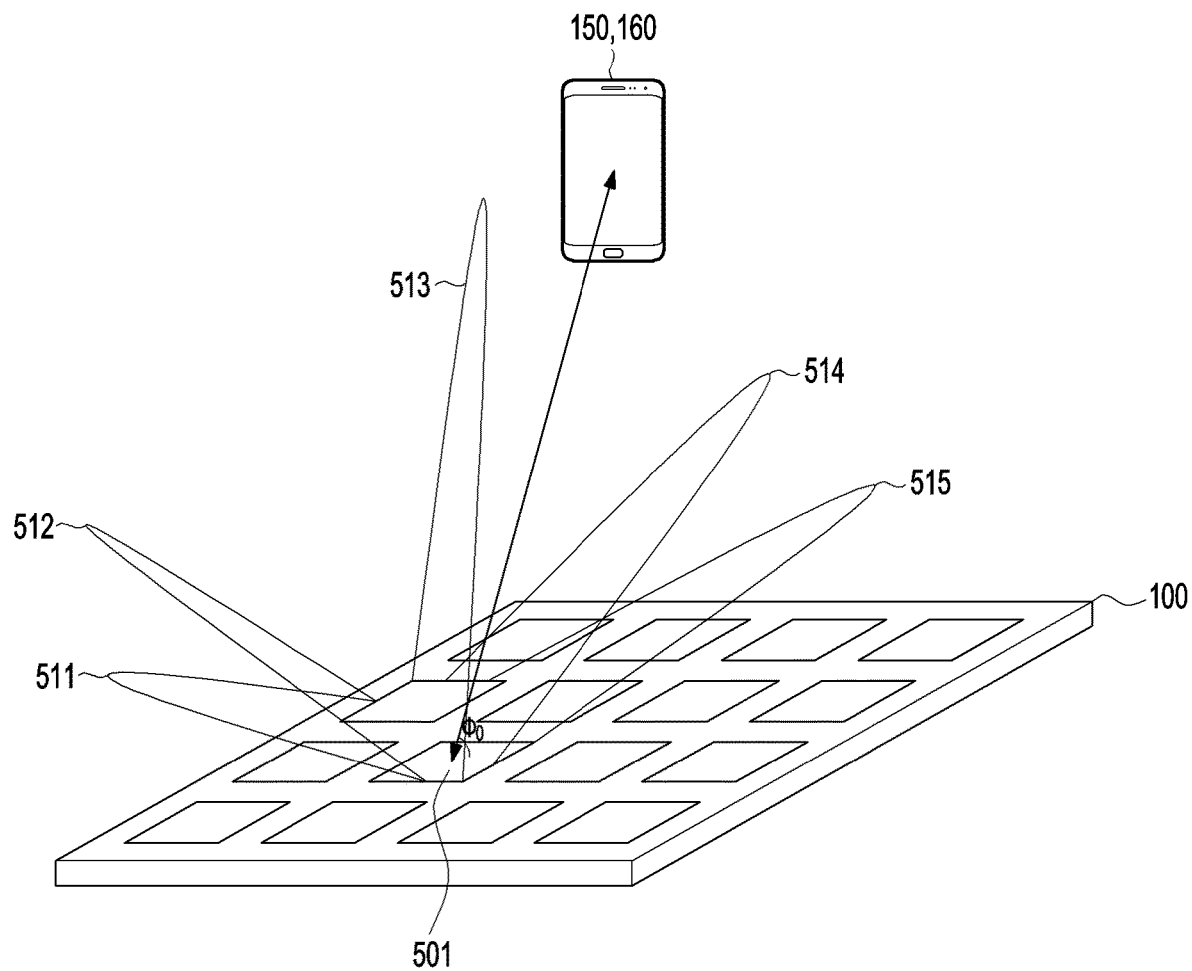
FIG. 5 illustrates an operation of a wireless power transmission device forming a plurality of different RF waves according to various embodiments.

FIG. 5 illustrates an operation of the wireless power transmission device 100 forming a plurality of different RF waves according to various embodiments.

For convenience of description, FIG. 5 shows an optimum phase value $\Phi_o$ between one antenna 501 of the wireless power transmission device 100 and the wireless power reception device 150 and 160, where an RF wave having a specific phase value may indicate a phase delay (or the extent of phase shift) of an electrical signal applied to a specific patch antenna, among patch antennas for forming an RF wave. The meaning of the optimum phase value $\Phi_o$ will be described later.

Figure 6A:
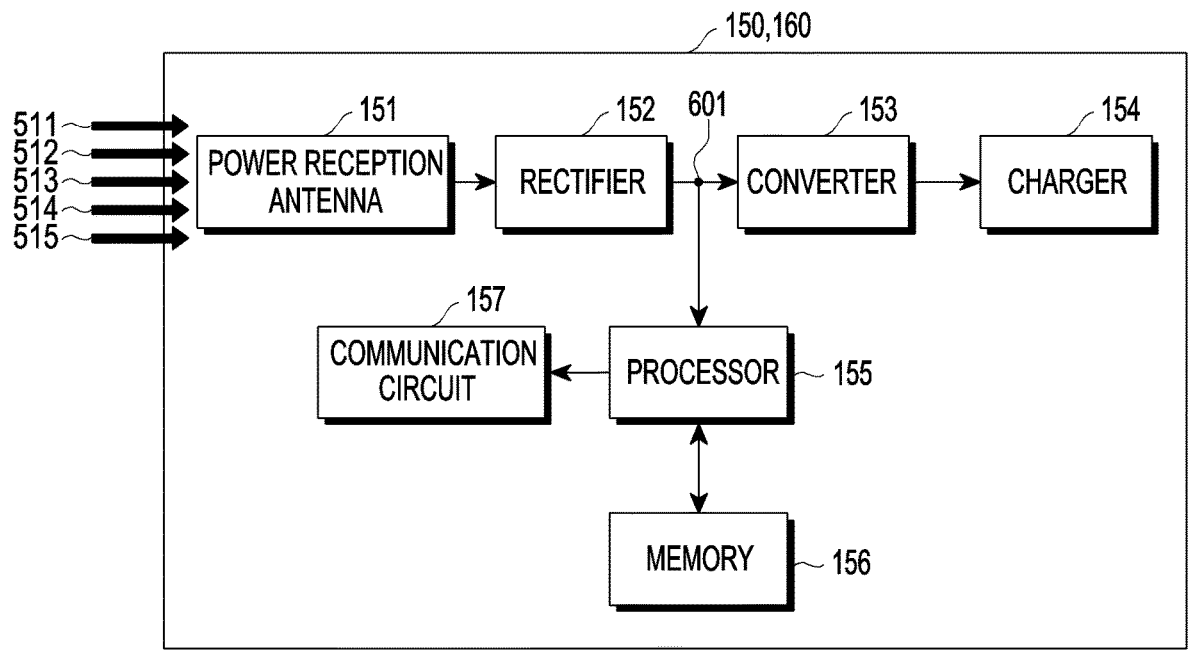
FIG. 6A illustrates an output voltage value of a rectifier of a wireless power reception device according to various embodiments.

FIG. 6A illustrates an output voltage value of a rectifier of the wireless power reception device according to various embodiments.

Figure 6B:
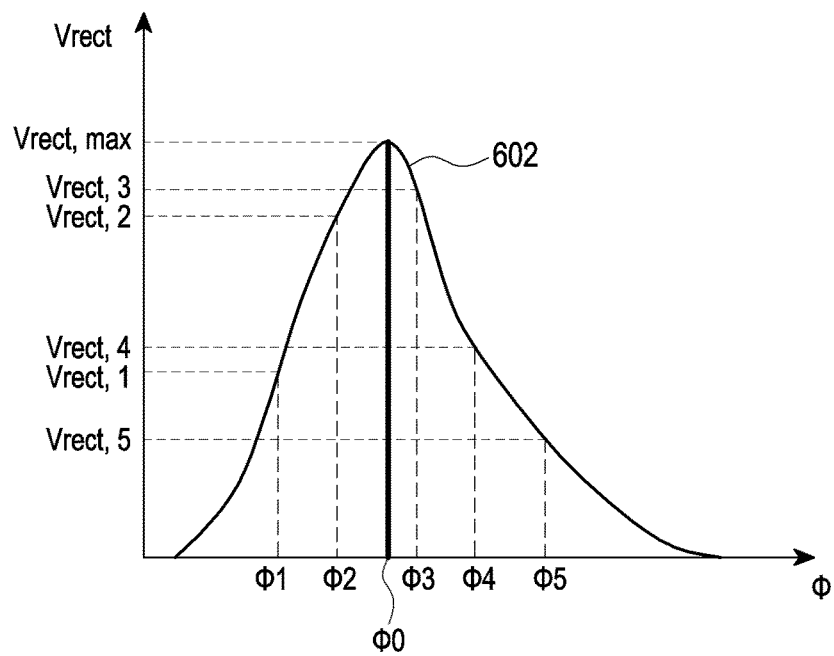
FIG. 6B illustrates an operation of a wireless power reception device identifying a plurality of pieces of strength information.

FIG. 6B illustrates an operation of the wireless power reception device identifying a plurality of pieces of strength information.

Hereinafter, various embodiments of the disclosure will be described with reference to FIG. 4 to FIG. 6. An embodiment of FIG. 4 will be described in detail with reference to FIG. 5, FIG. 6A, and FIG. 6B.

Referring to FIG. 4, in operation 401, the wireless power reception device 150 and 160 may sequentially receive a plurality of different RF waves from the wireless power transmission device 100. As shown in FIG. 5, the wireless power transmission device 100 may sequentially form a plurality of different RF waves using at least one antenna 501 among a plurality of antennas. For example, the at least one antenna 501 among the plurality of antennas of the wireless power transmission device 100 may sequentially form a first RF wave 511, a second RF wave 512, a third RF wave 513, a fourth RF wave 514, and a fifth RF wave 515 for a certain period. However, the wireless power transmission device 100 may form a greater number of RF waves, without being limited to what is shown in FIG. 5. The wireless power transmission device 100 may form sub-RF waves using at least two or more antennas, respectively, in order to form the plurality of different RF waves. In this case, one of the two or more antennas of the wireless power transmission device 100 may form a reference sub-RF wave as a reference antenna and the other antennas may form a plurality of sub-RF waves having different phases, so that the plurality of different RF waves have different strengths. For example, the wireless power transmission device may form a sub-RF wave having a first phase $\Phi_1$ on one antenna 501 in order to form the first RF wave 511, may form a sub-RF wave having a second phase $\Phi_2$ on one antenna 501 in order to form the second RF wave 512, may form a sub-RF wave having a third phase $\Phi_3$ on one antenna 501 in order to form the third RF wave 513, may form a sub-RF wave having a fourth phase $\Phi_4$ on one antenna 501 in order to form the fourth RF wave 514, and may form a sub-RF wave having a fifth phase $\Phi_5$ on one antenna 501 in order to form the fifth RF wave 515. The first to fifth phases $\Phi_1$ to $\Phi_5$ may be different from each other. Here, an RF wave having a specific phase value may indicate a phase delay (or the extent of phase shift) of an electrical signal applied to a specific patch antenna, among patch antennas for forming an RF wave.

Referring to FIG. 4, in operation 402, the wireless power reception device 150 and 160 may identify a plurality of pieces of strength information respectively indicating the strengths of the plurality of different RF waves 511 to 515. For example, the wireless power reception device 150 and 160 may detect an electrical value based on the plurality of different RF waves, and may identify the plurality of pieces of strength information respectively indicating the strengths of the plurality of different RF waves based on the detected electrical value. The electrical value may include at least one of a voltage value or a current value formed in the wireless power reception device 150 and 160 based on each of the plurality of different RF waves or variation in impedance in the wireless power reception device 150 and 160. The strength of each of the plurality of different RF waves may be determined by the wireless power reception device 150 and 160 according to approximation between the phase of each of the plurality of different RF waves 511 to 515 and an optimum phase $\Phi_o$. Referring to FIG. 5, the wireless power reception device 150 and 160 may identify that the third RF wave 513 having the third phase $\Phi_3$ closest to the optimum phase $\Phi_o$ among the plurality of different RF waves 511 to 515 may have the highest strength.

Referring to FIG. 6A, in at least part of operation 402, the wireless power reception device 150 and 160 may identify a plurality of voltage values sequentially formed based on the plurality of different RF waves 511 to 515 sequentially received for the certain period. For example, as shown in FIG. 6A, a processor 155 of the wireless power reception device 150 and 160 may identify a plurality of output voltage values (Vrect) of a rectifier 152 sequentially formed in an output terminal 601 of the rectifier for the certain period based on each of the plurality of different waves 511 to 515 sequentially received for the certain period.

Here, referring to FIG. 6B, the processor 155 may identify the rectifier output voltage value (Vrect) per phase of a sub-RF wave formed on one antenna 501. For example, the processor 155 may identify a first rectifier output voltage value (Vrect, 1) formed in the output terminal 601 of the rectifier corresponding to the first RF wave 511 formed based on the reference sub-RF wave and the sub-RF wave having the first phase $\Phi_1$ on one antenna 501, may identify a second rectifier output voltage value (Vrect, 2) formed in the output terminal 601 of the rectifier corresponding to the second RF wave 512 formed based on the reference sub-RF wave and the sub-RF wave having the second phase $\Phi_2$ on one antenna 501, may identify a third rectifier output voltage value (Vrect, 3) formed in the output terminal 601 of the rectifier corresponding to the third RF wave 513 formed based on the reference sub-RF wave and the sub-RF wave having the third phase $\Phi_3$ on one antenna 501, may identify a fourth rectifier output voltage value (Vrect, 4) formed in the output terminal 601 of the rectifier corresponding to the fourth RF wave 514 formed based on the reference sub-RF wave and the sub-RF wave having the fourth phase $\Phi_4$ on one antenna 501, and may identify a fifth rectifier output voltage value (Vrect, 5) formed in the output terminal 601 of the rectifier corresponding to the fifth RF wave 515 formed based on the reference sub-RF wave and the sub-RF wave having the fifth phase $\Phi_5$ on one antenna 501. The rectifier output voltage values (Vrect, 1 to 5) may indicate the strengths of the plurality of received different waves 511 to 515, respectively. For example, the greater the rectifier output voltage values (Vrect, 1 to 5) may be, the higher the strengths of the RF waves corresponding to the rectifier output voltage values (Vrect, 1 to 5) may be, and the smaller the rectifier output voltage values (Vrect, 1 to 5) may be, the lower the strengths of the RF waves corresponding to the rectifier output voltage values (Vrect, 1 to 5) may be.

The wireless power reception device 150 and 160 may identify each of the plurality of different RF waves 511 to 515 sequentially formed in the wireless power transmission device 100 or the sub-RF waves sequentially formed on one antenna 501 based on a change in the identified strength information. For example, when an output voltage value (Vrect) of the rectifier 152 identified by the processor 155 rapidly changes, the processor 155 may detect that the phases of the RF waves formed in the wireless power transmission device 100 or the phases of the sub-RF waves formed on one antenna 501 are changed. The processor 155 may assign identification information for identifying each of the RF waves 511 to 515 or each of the sub-RF waves formed on one antenna 501 to each identified output voltage value (Vrect) of the rectifier 152 based on a change in the output voltage value (Vrect) of the rectifier 152. For example, the processor 155 may assign different pieces of identification information to the first rectifier output voltage value (Vrect, 1) before a rapid change in the output voltage value (Vrect) of the rectifier 152 and the second rectifier output voltage value (Vrect, 2) after the rapid change in the output voltage value (Vrect) of the rectifier 152, thereby distinguishing RF waves or sub-RF waves corresponding to the respective output voltage values (Vrect, 1 and 2) from each other. The identification information may be order information. Accordingly, regarding the identification information, in a subsequent operation of identifying an optimum phase value $\Phi_o$, the wireless power reception device 150 and 160 may identify order information assigned to the identified output voltage values (Vrect, 1 to 5), and may transmit the order information to the wireless power transmission device 100, and the wireless power transmission device 100 may identify at least one of the RF waves 511 to 515 or at least one of the sub-RF waves formed on one antenna 501 corresponding to the received order information.

Referring to FIG. 4, in operation 404, the wireless power reception device 150 and 160 may identify a plurality of pieces of phase information corresponding to the respective sub-RF waves formed on one antenna 501. The plurality of pieces of phase information may be identified by at least one processor 155 based on first information about the phases of the respective sub-RF waves formed on one antenna 501 of the wireless power transmission device 100 previously stored in a memory of the wireless power reception device 150 and 160. For example, the wireless power reception device 150 and 160 may identify phase configuration information according to each sub-RF wave formation order of the wireless power transmission device 100 based on the previously stored first information, and may identify the phases of the respective sub-RF waves on an antenna 501 forming each of the RF waves 511 to 515 sequentially received based on the identified phase configuration information. For example, the first information may be system information including random number generation information associated with a phase configuration of the wireless power transmission device 100 or information about the phase configuration of the wireless power transmission device 100. The wireless power transmission device 100 may sequentially configure the phase of each of the plurality of different RF waves according to a random number sequentially generated according to the random number generation information of the system information. Therefore, the processor 155 may identify a random number to be sequentially generated in the wireless power transmission device 100 according to the random number generation information of the previously stored system information and may identify the phases of the respective sub-RF waves formed on one antenna 501 and forming the plurality of different sequentially received RF waves based on the identified random number. Accordingly, the wireless power reception device 150 and 160 may identify the first phase $\Phi_1$, which is the phase of the sub-RF wave formed on one antenna 501 and forming the received first RF wave 511, may identify the second phase $\Phi_2$, which is the phase of the sub-RF wave formed on one antenna 501 and forming the received second RF wave 512, may identify the third phase $\Phi_3$, which is the phase of the sub-RF wave formed on one antenna 501 and forming the received third RF wave 513, may identify the fourth phase $\Phi_4$, which is the phase of the sub-RF wave formed on one antenna 501 and forming the received fourth RF wave 514, and may identify the fifth phase $\Phi_5$, which is the phase of the sub-RF wave formed on one antenna 501 and forming the received fifth RF wave 515.

Referring to FIG. 4, in operation 404, the wireless power reception device 150 and 160 may identify an optimum phase value $\Phi_o$ for allowing an RF wave received from at least one antenna 501 to have a maximum strength based on a plurality of pieces of strength information and the plurality of pieces of phase information. For example, the wireless power reception device 150 and 160 may calculate the optimum phase value $\Phi_o$ to be configured for a sub-RF wave from one antenna 501 so that an RF wave received from the wireless power transmission device 100 is formed to have the maximum strength based on the plurality of pieces of strength information and the plurality of pieces of phase information. That is, the wireless power reception device 150 and 160 may calculate the optimum phase value $\Phi_o$ of the sub-RF wave from one antenna 501 to allow the largest rectifier output voltage value (Vrect) to be formed in the wireless power reception device 150 and 160 based on the plurality of pieces of strength information and the plurality of pieces of phase information.

As shown in FIG. 5, the plurality of different RF waves 511 to 515 formed by the wireless power transmission device 100 may not be RF waves that allow the wireless power reception device 150 and 160 to have the maximum strength. Accordingly, the wireless power reception device 150 and 160 may identify the optimum phase value $\Phi_o$ that allows a received RF wave to have the maximum strength based on the plurality of pieces of strength information and the plurality of pieces of phase information. That is, since the optimum phase value $\Phi_o$ calculated by the wireless power reception device 150 and 160 may be different from the phases $\Phi_1$ to $\Phi_5$ of the respective sub-RF waves formed on one antenna 501 and forming the plurality of different RF waves 511 to 515 formed by the wireless power transmission device 100, the wireless power reception device 150 and 160 may calculate the optimum phase value $\Phi_o$. Referring to FIG. 6B, the wireless power reception device 150 and 160 may calculate the optimum phase value $\Phi_o$ based on the rectifier output voltage values (Vrect, 1 to 5) by the plurality of different RF waves 511 to 515 and the phase information $\Phi_1$ to $\Phi_5$. This calculation may be performed based on at least one of interpolation, extrapolation, or curve fitting (or graph fitting). For example, as shown in FIG. 6B, the wireless power reception device 150 and 160 may identify a graph 602 including the rectifier output voltage values corresponding to the respective identified phases $\Phi_1$ to $\Phi_5$ of the sub-RF waves forming each of the plurality of different RF waves 511 to 515, may identify the maximum rectifier output voltage value (Vrect, max) in the identified graph 602, and may identify a phase corresponding to the identified maximum rectifier output voltage values (Vrect, max) as the optimum phase value $\Phi_o$. Here, the processor 155 may identify significant rectifier output voltage values among the identified rectifier output voltage values (Vrect, 1 to 5), and may perform the foregoing calculation only on the identified significant rectifier output voltage values in order to improve the calculation speed. For example, the processor 155 may identify rectifier output voltage values equal to or greater than a preset voltage value among the rectifier output voltage values, and may perform calculations on the identified rectifier output voltage values, thereby determining the optimum phase value $\Phi_o$.

Alternatively, the processor 155 may identify the maximum rectifier output voltage value (Vrect, max) among the identified rectifier output voltage values (Vrect, 1 to 5), and may identify, as the optimum phase value $\Phi_o$, the phase of a sub-RF wave forming an RF wave corresponding to the identified maximum rectifier output voltage among the plurality of different RF waves 511 to 515. In this case, the wireless power reception device 150 and 160 may perform only an operation of selecting the maximum value from among the received values without performing interpolation, extrapolation, or curve fitting for calculating the optimum phase value $\Phi_o$, thus reducing the operation load of the wireless power reception device 150 and 160 and further reducing the amount of time taken for the wireless power transmission device 100 to obtain the optimum phase value $\Phi_o$ from the wireless power reception device 150 and 160.

Referring to FIG. 4, in operation 405, the wireless power reception device 150 and 160 may transmit a communication signal including information about the optimum phase value $\Phi_o$ to the wireless power transmission device 100. Upon receiving the communication signal including the information about the optimum phase value $\Phi_o$ from the wireless power reception device 150 and 160, the wireless power transmission device 100 may form a sub-RF wave having the optimum phase value $\Phi_o$ on one antenna 501. Alternatively, the wireless power reception device 150 and 160 may transmit a communication signal including the identification information to the wireless power transmission device 100. The wireless power transmission device 100 may identify at least one of the plurality of different RF waves 511 to 515 corresponding to the received identification information or the sub-RF waves forming each of the plurality of different RF waves 511 to 515 and may identify the phase of at least one of the identified sub-RF waves as the optimum phase value $\Phi_o$. As described above, the wireless power reception device 150 and 160 may not respond a plurality of times to the plurality of different RF waves 511 to 515 received from the wireless power transmission device 100, but may implicitly perform calculations corresponding to respective ones among the plurality of received different RF waves 511 to 515, and may transmit only the results of the performed calculations in only one response. Accordingly, the amount of time taken for the wireless power transmission device 100 to receive the optimum phase value $\Phi_o$ may be reduced by the time required for the wireless power reception device 150 and 160 to make a plurality of responses, which are not actually made due to the operation of transmitting only the results of the calculations once. That is, the wireless power transmission device 100 may quickly identify the optimum phase value $\Phi_o$ and may apply the optimum phase value to the antenna.

The wireless power transmission device 100 and the wireless power reception device 150 and 160 may perform a greater or smaller number of operations than operation 401 to operation 405. Further, operation 401 to operation 405 may be performed in various orders without being limited to the described order.

Hereinafter, various embodiments related to operation 401 to operation 405 described above will be described.

Figure 7:
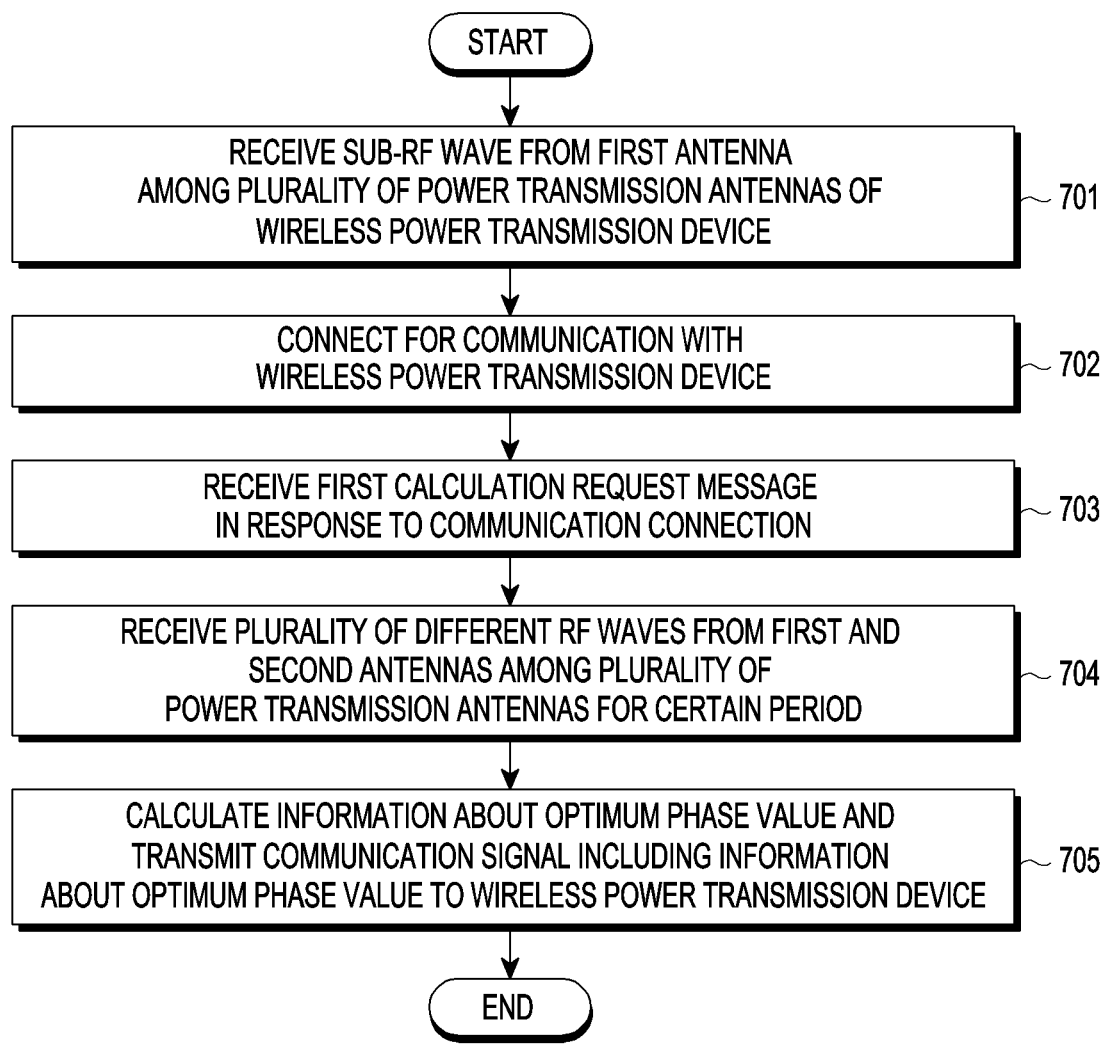
FIG. 7 is a flowchart illustrating an operation of a wireless power reception device receiving a plurality of different RF waves according to various embodiments.

FIG. 7 is a flowchart illustrating an operation of the wireless power reception device 150 and 160 receiving a plurality of different RF waves according to various embodiments.

Figure 8:
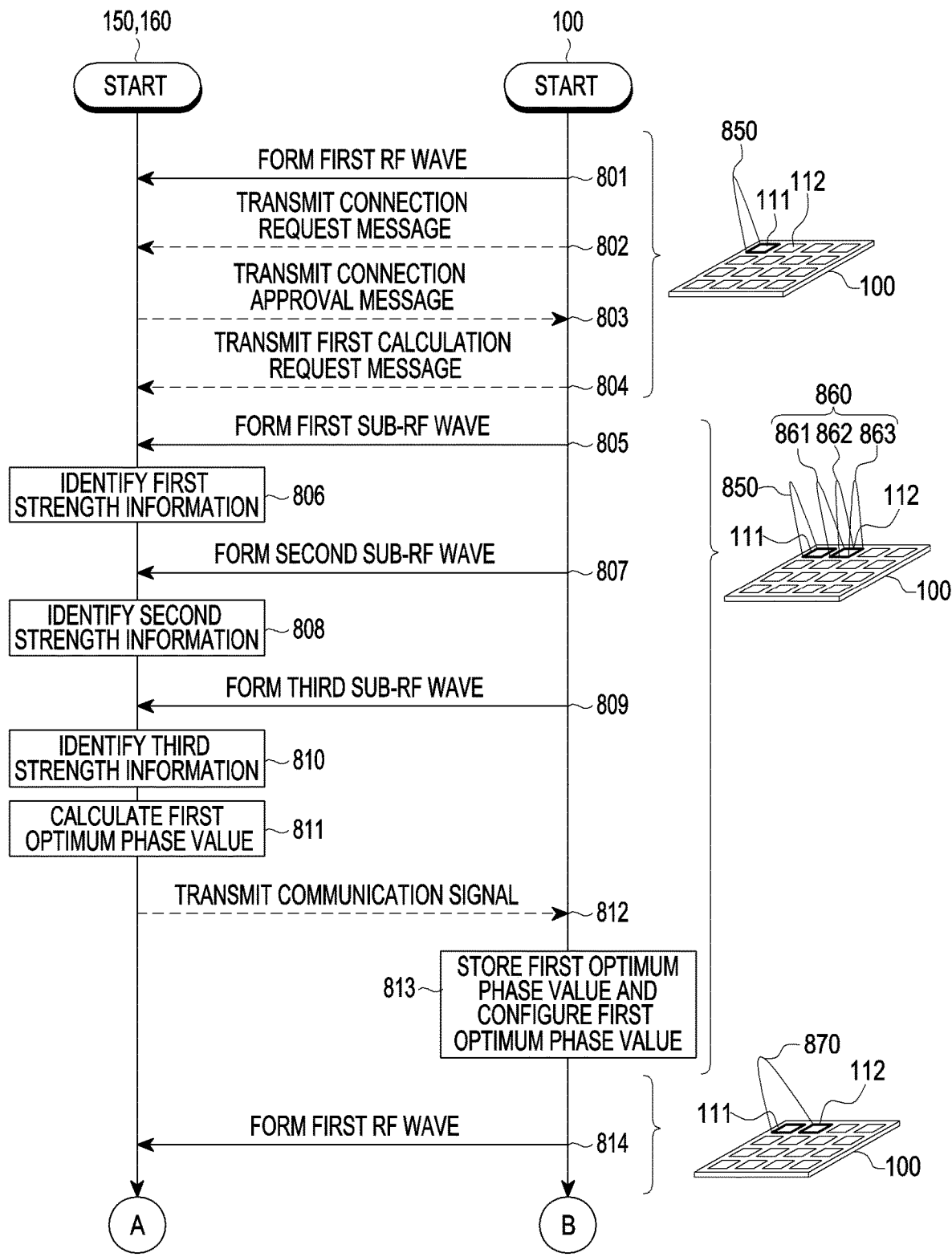
FIG. 8 is a flowchart illustrating data exchange between a wireless power reception device and a wireless power transmission device and formation of an RF wave by a wireless power transmission device according to various embodiments.

FIG. 8 is a flowchart illustrating data exchange between the wireless power reception device 150 and 160 and the wireless power transmission device 100 and formation of an RF wave by the wireless power transmission device 100 according to various embodiments.

FIG. 8 shows that a first antenna 111 forms a sub-RF wave 850 having directivity and a second antenna 112 forms sub-RF waves 861, 862 and 863, but this is only for illustrative purposes. For example, the sub-RF waves 861, 862, and 863 are divided to visually show a phase difference, and it will be easily understood by those skilled in the art that the individual antennas 111 and 112 form sub-RF waves having different phases. An RF wave 870 shown in FIG. 8 is a visual representation of a directional RF wave 870 being formed due to interference by at least one of the sub-RF wave 850 and the sub-RF waves 861, 862, and 863.

Hereinafter, various embodiments of the disclosure will be described with reference to FIG. 7 and FIG. 8. An embodiment of FIG. 7 will be described in detail with reference to FIG. 8.

Referring to FIG. 7, in operation 701, the wireless power reception device 150 and 160 may receive the sub-RF 850 wave from the first antenna 111 among a plurality of power transmission antennas 111 to 126 of the wireless power transmission device 100. That is, referring to FIG. 8, in operation 801, the wireless power transmission device 100 may form the sub-RF wave 850 through the first antenna 111 among the plurality of power transmission antennas 111 to 126. The sub-RF wave 850 may charge the wireless power reception device 150 and 160. For example, the wireless power reception device 150 and 160 which is discharged may be charged based on the received sub-RF wave 850 to enter a state of being capable of performing some operations.

In at least part of operation 801, the wireless power transmission device 100 may start transmitting the sub-RF wave 850 through the first antenna 111 based on a preset initiation condition. For example, upon detecting that the wireless power reception device 150 and 160 is within a reference distance from the wireless transmission device 100 using at least one sensor (ultrasonic sensor, sound sensor, or the like, not shown), the wireless power transmission device 100 may transmit the sub-RF wave 850 through the first antenna 111. The sub-RF wave 850 may be a reference sub-RF wave. In another example, when the wireless power reception device 150 and 160 is registered in a network system to which the wireless power transmission device 100 belongs, the wireless power transmission device 100 may detect that the wireless power reception device 150 and 160 is registered in the network system, and may transmit the sub-RF wave 850 through the first antenna 111. In still another example, the wireless power transmission device 100 may detect the wireless power reception device 150 and 160 based on a device discovery operation used in a communication connection operation, such as a Wi-Fi Direct connection or a Bluetooth connection, and may transmit the sub-RF wave 850 through the first antenna 111. In yet another example, the wireless power transmission device 100 may transmit the sub-RF wave 850 through the first antenna 111 based on user input for starting wireless charging. The user input for starting wireless charging may be directly received by the wireless power transmission device 100, but is not limited thereto. Instead, the wireless power reception device 150 and 160 may receive user input for starting wireless charging and may provide a message corresponding to the user input to the wireless power transmission device 100, thereby providing the user input to the wireless power transmission device 100.

Referring to FIG. 7, in operation 702, the wireless power reception device 150 and 160 may connect to the wireless power transmission device 100 for communication therewith. Referring to FIG. 8, in operation 802, the wireless power transmission device 100 may transmit a connection request message for communication connection between the wireless power transmission device 100 and the wireless power reception device 150 and 160. That is, the communication circuit 157 of the wireless power reception device 150 and 160 may receive the connection request message for communication connection between the wireless power transmission device 100 and the wireless power reception device 150 and 160 from the wireless power transmission device 100. The connection request message may include at least one of identification information about the wireless power transmission device 100 and first communication connection information for communication connection. In operation 803, the communication circuit 157 of the wireless power reception device 150 and 160 may transmit a connection approval message to the wireless power transmission device 100 in response to the received connection request message. That is, the wireless power transmission device 100 may receive the connection approval message in response to the transmitted connection request message. The connection approval message may include at least one of identification information about the wireless power reception device 150 and 160 and second communication connection information for communication connection. When the wireless power transmission device 100 receives the connection approval message, a communication connection between the communication circuit 157 of the wireless power reception device 150 and 160 and the communication circuit 104 of the wireless power transmission device 100 may be established. The wireless power reception device 150 and 160 and the wireless power transmission device 100 may exchange communication signals including data or predetermined information through the established communication connection.

Referring to FIG. 7, in operation 703, the wireless power reception device 150 and 160 may receive a first calculation request message. Referring to FIG. 8, in operation 804, the wireless power transmission device 100 may transmit the first calculation request message upon establishing the communication connection.

The first calculation request message may trigger operations of the wireless power reception device 150 and 160 identifying a plurality of pieces of strength information, identifying a plurality of pieces of phase information, identifying an optimum phase value $\Phi_o$, or transmitting a communication signal including the optimum phase value $\Phi_o$. For example, in response to the received first calculation request message, the wireless power reception device 150 and 160 may perform an operation of identifying strength information about each of a plurality of different RF waves received from the wireless power transmission device 100, an operation of identifying phase information corresponding to each of the plurality of received different RF waves, an operation of identifying an optimum phase value $\Phi_o$ based on the identified strength information and phase information, and an operation of transmitting a communication signal including the identified optimum phase value $\Phi_o$. That is, when the wireless power reception device 150 and 160 does not receive the first calculation request message, the wireless power reception device 150 and 160 may not perform operation 402 to operation 405 described above.

In addition, the first calculation request message may allow the established communication connection between the wireless power reception device 150 and 160 and the wireless power transmission device 100 to be maintained. That is, the communication connection established between the communication circuit 157 of the wireless power reception device 150 and 160 and the communication circuit 104 of the wireless power transmission device 100 may be maintained by the first calculation request message. For example, the calculation request message may allow the communication circuit 157 of the wireless power reception device 150 and 160 to be in an operable state.

Referring to FIG. 7, in operation 704, the wireless power reception device 150 and 160 may receive a plurality of different RF waves from the first antenna 111 and the second antenna 112 among the plurality of power antennas of the wireless power transmission device 100 for a certain period. Referring to FIG. 8, the wireless power transmission device 100 may form a first sub-RF wave 861 having a first phase $\Phi_1$ in operation 805, may form a second sub-RF wave 862 having a second phase $\Phi_2$ in operation 807, and may form a third sub-RF wave 863 having a third phase $\Phi_3$ in operation 809 on the second antenna 112 among at least one or more power transmission antennas 111 to 126. Accordingly, the wireless power transmission device 100 may form a plurality of different RF waves through the first antenna 111 and the second antenna 112. For example, the wireless power transmission device 100 may form an RF wave based on the sub-RF wave 850 formed on the first antenna 111 and the first sub-RF wave 861 formed on the second antenna 112, may form an RF wave based on the sub-RF wave 850 formed on the first antenna 111 and the second sub-RF wave 862 formed on the second antenna 112, and may form an RF wave based on the sub-RF wave 850 formed on the first antenna 111 and the third sub-RF wave 863 formed on the second antenna 112. The wireless power reception device 150 and 160 may sequentially receive the plurality of different RF waves for the certain period. For example, the wireless power reception device 150 and 160 may sequentially receive the RF wave formed based on the sub-RF wave 850 formed on the first antenna 111 and the first sub-RF wave 861 formed on the second antenna 112, the RF wave formed based on the sub-RF wave 850 formed on the first antenna 111 and the second sub-RF wave 862 formed on the second antenna 112, and the RF wave formed based on the sub-RF wave 850 formed on the first antenna 111 and the third sub-RF wave 863 formed on the second antenna 112 for the certain period.

Referring to FIG. 7, as described above, in operation 705, the wireless power reception device 150 and 160 may identify at least one piece of information for calculating a first optimum phase value ($\Phi_o$, 1), may calculate the first optimum phase value ($\Phi_o$, 1), and may transmit a communication signal including information about the calculated first optimum phase value ($\Phi_o$, 1) to the wireless power transmission device 100. Referring to FIG. 8, the wireless power reception devices 150 and 160 may identify a first rectifier output voltage value (Vrect, 1) corresponding to the received RF wave formed based on the sub-RF wave 850 formed on the first antenna 111 and the first sub-RF wave 861 formed on the second antenna 112 in operation 806, may identify a second rectifier output voltage value (Vrect, 2) corresponding to the received RF wave formed based on the sub-RF wave 850 formed on the first antenna 111 and the second sub-RF wave 862 formed on the second antenna 112 in operation 808, and may identify a third rectifier output voltage value (Vrect, 3) corresponding to the received RF wave formed based on the sub-RF wave 850 formed on the first antenna 111 and the third sub-RF wave 863 formed on the second antenna 112 in operation 810. The wireless power reception device 150 and 160 may calculate the first optimum phase value $\Phi_o$, 1) based on the first to third output voltage values (Vrect, 1 to 3), identified in operation 806, operation 808, and operation 810, and the identified phase information in operation 811, and may transmit the first optimum phase value ($\Phi_o$, 1) to the wireless power transmission device 100 in operation 812. The method for calculating the first optimum phase value ($\Phi_o$, 1) may be performed as described above in operation 705, and thus a redundant description thereof will be omitted.

Upon receiving the communication signal including the first optimum phase value ($\Phi_o$, 1) received in operation 812, the wireless power transmission device 100 may store and configure the first optimum phase value ($\Phi_o$, 1). For example, the wireless power transmission device 100 may store the received first optimum phase value $\Phi_o$, 1) in the memory, and the processor 103 may configure the phase value of a sub-RF wave formed on the second antenna 112 as the first optimum phase value ($\Phi_o$, 1). Accordingly, the wireless power transmission device 100 may form a first RF wave 870 in operation 814. For example, the wireless power transmission device 100 may form the first RF wave 870 based on the sub-RF wave 850 formed on the first antenna 111 and a sub-RF wave formed on the second antenna 112 and having the first optimum phase value ($\Phi_o$, 1). The wireless power reception device 150 and 160 may receive the first RF wave 870.

The wireless power transmission device 100 and the wireless power reception device 150 and 160 may perform a greater or smaller number of operations than operation 701 to operation 705, and are not limited to the foregoing description. Further, operation 701 to operation 705 may be performed in various orders, and are not limited to the described order.

Hereinafter, various embodiments after configuring the optimum phase value $\Phi_o$ of the second antenna 112 of the wireless power transmission device 100 will be described.

Figure 9:
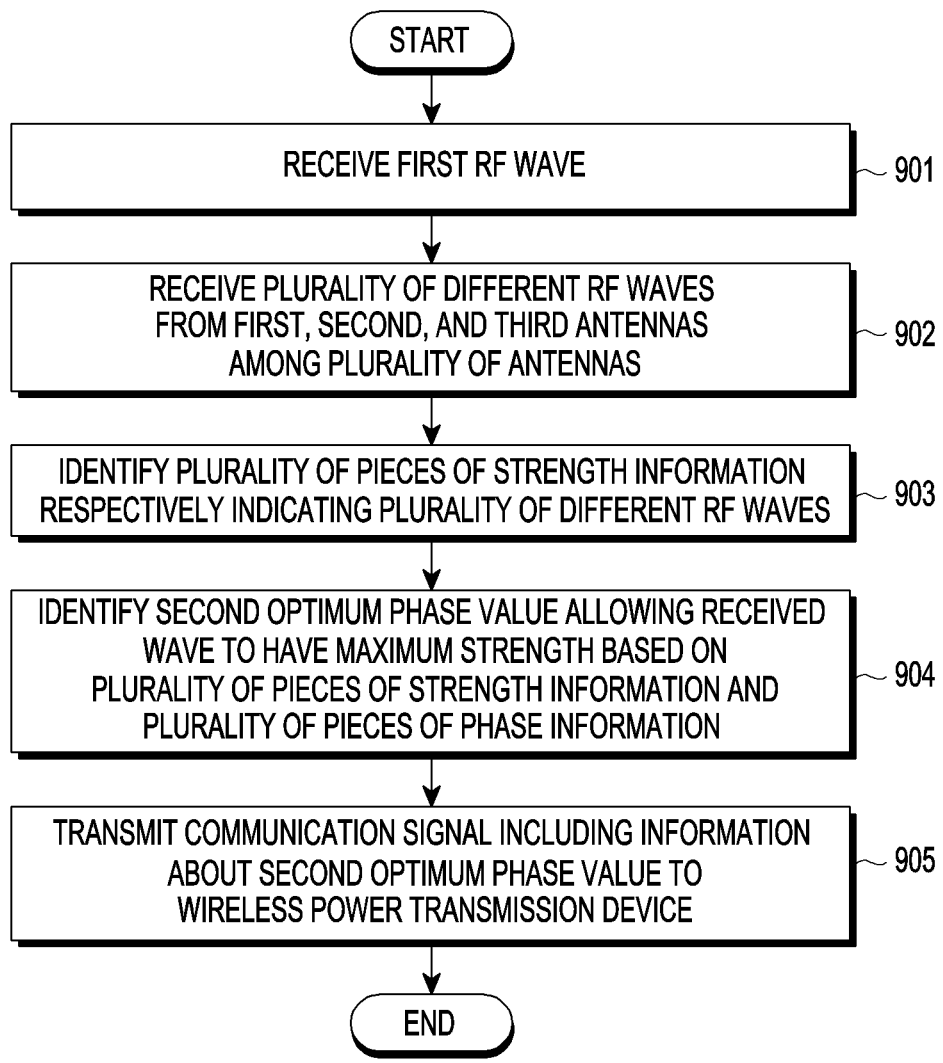
FIG. 9 is a flowchart illustrating sequential configuration of optimum phase values of a plurality of power transmission antennas of a wireless power transmission device according to various embodiments.

FIG. 9 is a flowchart illustrating sequential configuration of optimum phase values $\Phi_o$ of a plurality of power transmission antennas of the wireless power transmission device 100 according to various embodiments.

Figure 10:
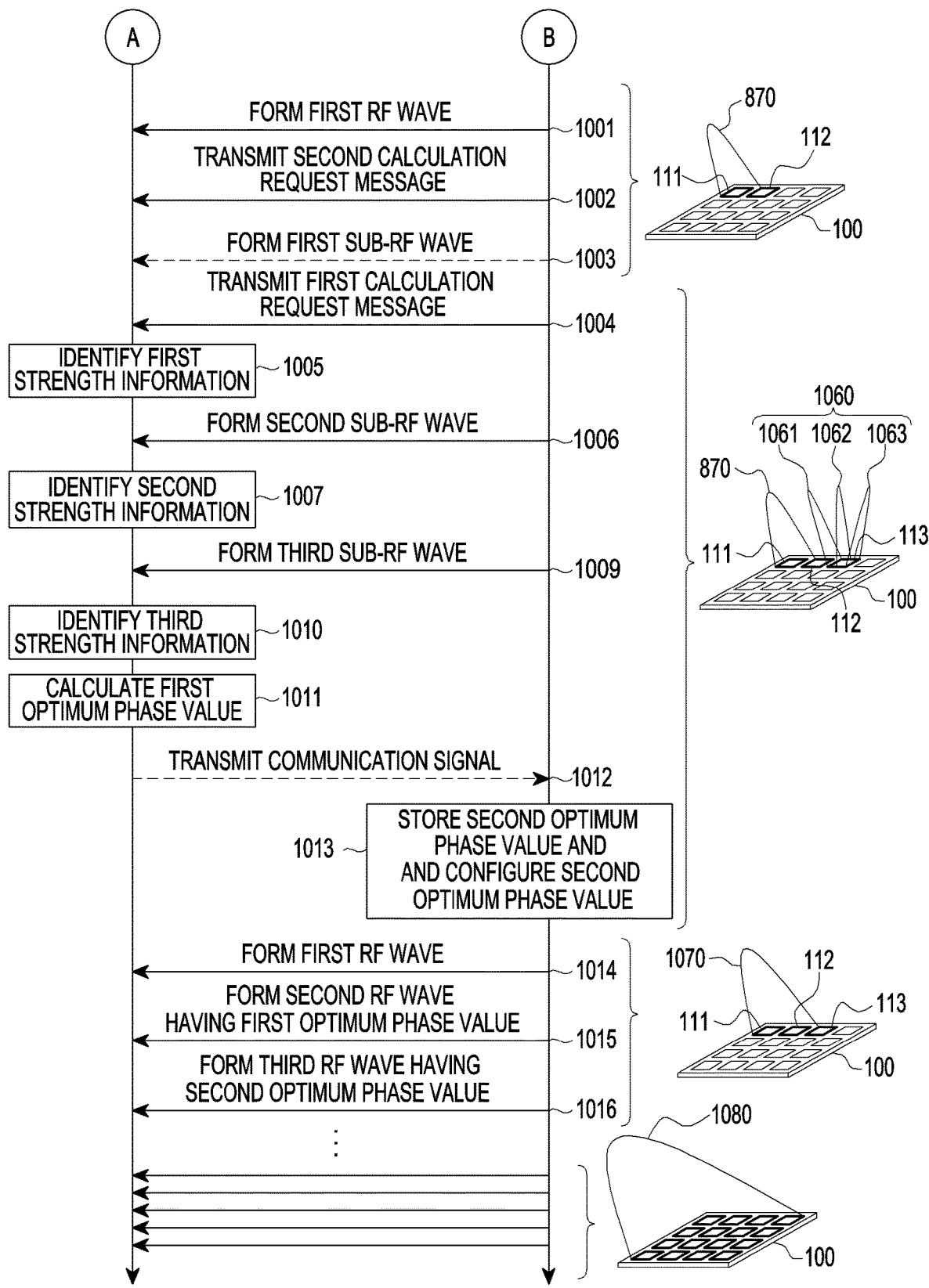
FIG. 10 is a flowchart illustrating data exchange between a wireless power reception device and a wireless power transmission device and formation of an RF wave by a wireless power transmission device according to various embodiments.

FIG. 10 is a flowchart illustrating data exchange between the wireless power reception device 150 and 160 and the wireless power transmission device 100 and formation of an RF wave by the wireless power transmission device 100 according to various embodiments.

Figure 11:
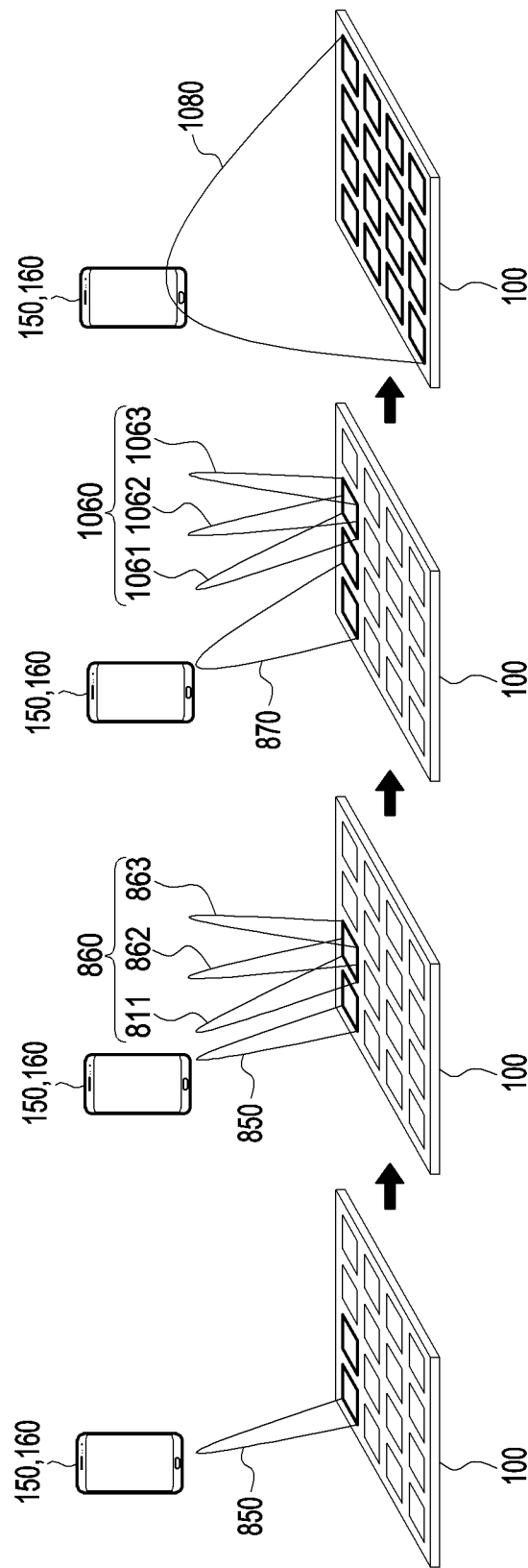
FIG. 11 illustrates sequential configuration of optimum phase values of a plurality of power transmission antennas of a wireless power transmission device according to various embodiments.

FIG. 11 illustrates sequential configuration of optimum phase values $\Phi_o$ of a plurality of power transmission antennas of the wireless power transmission device 100 according to various embodiments.

FIG. 10 and FIG. 11 show that the first antenna 111 and the second antenna 112 form the first RF wave 870 having directivity and a third antenna 113 forms sub-RF waves 1061, 1062, and 1063, but this is only for illustrative purposes. For example, the sub-RF waves 1061, 1062, and 1063 are divided to visually show a phase difference, and it will be easily understood by those skilled in the art that the antennas 111 and 112 form RF waves having different phases and the third antenna 113 forms sub-RF waves having different phases. An RF wave 1070 shown in FIG. 10 and FIG. 11 is a visual representation of a directional RF wave 1070 being formed according to interference by at least one of the RF wave 870 and the sub-RF waves 1061, 1062, and 1063. The RF wave 1080 shown in FIG. 10 and FIG. 11 is a visual representation of a directional RF wave 1080 being formed according to interference by sub-RF waves formed by the respective antennas of the wireless power transmission device 100.

Hereinafter, various embodiments will be described with reference to FIG. 9 to FIG. 11. The embodiment of FIG. 9 will be described in detail with reference to FIG. 10 and FIG. 11.

According to various embodiments, after configuring the optimum phase value $\Phi_o$ of an RF wave formed on one of the plurality of power transmission antennas 111 to 126, the wireless power transmission device 100 may continue to sequentially configure the optimum phase values $\Phi_o$ of RF waves formed via antennas other than the first antenna 111 and the second antenna 112, among the plurality of power transmission antennas 111 to 126.

Referring to FIG. 9, the wireless power reception device 150 and 160 may receive the first RF wave 870 from the wireless power transmission device 100 in operation 901. That is, referring to FIG. 10, while receiving the first RF wave 870 formed based on the sub-RF wave 850 formed on the first antenna 111 and the sub-RF wave formed on the second antenna 112 and having the first optimum phase value $\Phi_o$, 1) in operation 1001, the wireless power reception device 150 and 160 may calculate the optimum phase value $\Phi_o$ of a different antenna. While calculating the optimum phase value $\Phi_o$ of the different antenna, the wireless power reception device 150 and 160 may be charged based on the received first RF wave 870. As the wireless power reception device 150 and 160 is charged while calculating the optimum phase value $\Phi_o$, the time taken to fully charge the wireless power reception device 150 and 160 may be reduced.

Referring to FIG. 9, in operation 902, the wireless power reception device may sequentially receive a plurality of different RF waves from the first antenna 111, the second antenna 112, and the third antenna 113, among the plurality of antennas, for a certain period.

Referring to FIG. 10, in operation 1002, the wireless power reception device 150 and 160 may receive a second calculation request message for requesting calculation of a second optimum phase value $\Phi_o$, 2) from the wireless power transmission device 100. For example, the wireless power transmission device 100 may transmit the second calculation request message to the wireless power reception device 150 and 160 upon receiving the communication signal including the first optimum phase value ($\Phi_o$, 1). Alternatively, for example, the wireless power transmission device 100 may transmit the second calculation request message to the wireless power reception device 150 and 160 upon configuring the phase of the sub-RF wave formed on the second antenna 112 as the first optimum phase value $\Phi_o$, 1). Upon receiving the second operation request message, the wireless power reception device 150 and 160 may perform the foregoing operations, triggered in response to the received first calculation request message. Therefore, a redundant description thereof is omitted.

Referring to FIG. 10, the wireless power reception device 150 and 160 may receive a plurality of different RF waves formed based on a plurality of different sub-RF waves 1060 sequentially formed on the third antenna 113 in a certain period. For example, the wireless power transmission device 100 may form a first sub-RF wave 1061 having a first phase $\Phi_1$ on the third antenna 113 in operation 1003, may form a second sub-RF wave 1062 having a second phase $\Phi_2$ on the third antenna 113 in operation 1005, and may form a third sub-RF wave 1063 having a third phase $\Phi_3$ on the third antenna 113 in operation 1007. Accordingly, the wireless power transmission device 100 may sequentially form an RF wave based on the first RF wave 870 and the first sub-RF wave 1061 formed on the third antenna 113, an RF wave based on the first RF wave 870 and the second sub-RF wave 1062 formed on the third antenna 113, and an RF wave based on the first RF wave 870 and the third sub-RF wave 1063 formed on the third antenna 113 for a certain period. The wireless power reception device 150 and 160 may receive the RF wave based on the first RF wave 870 and the first sub-RF wave 1061 formed on the third antenna 113, the RF wave based on the first RF wave 870 and the second sub-RF wave 1062 formed on the third antenna 113, and the RF wave based on the first RF wave 870 and the third sub-RF wave 1063 formed on the third antenna 113.

Referring to FIG. 9, the wireless power reception device 150 and 160 may identify a plurality of pieces of strength information indicating the strength of each of the plurality of received different RF waves in operation 903, may identify the second optimum phase value ($\Phi_o$, 2) allowing a received RF wave to have the maximum strength based on the plurality of pieces of strength information and a plurality of pieces of phase information in operation 904, and may transmit a communication signal including information about the second optimum phase value ($\Phi_o$, 2) to the wireless power transmission device 100 in operation 905. Operation 903 to operation 905 may be performed in the same manner as operation 704 and operation 705, and thus a redundant description thereof is omitted. The average of the pieces of strength information about the plurality of different RF waves formed based on the different sub-RF waves 1060 formed on the third antenna 113 of the wireless power transmission device 100, which are identified by the wireless power reception device 150 and 160, may be greater than the average of the pieces of strength information about the plurality of different RF waves formed based on the different sub-RF waves 860 formed on the second antenna 112. For example, referring to FIG. 10, the average of first strength information, second strength information, and third strength information identified by the wireless power reception device 150 and 160 in operation 1005, operation 1007, and operation 1009, respectively, may be greater than the average of first strength information identified in operation 806, second strength information identified in operation 808, and third strength information identified in operation 810. This is because, in the wireless power reception device 150 and 160, a rectifier output voltage may be further formed in the output terminal 601 of the rectifier based on the plurality of different sub-RF waves 1060 from the third antenna 113, with a rectifier output voltage formed in the output terminal 601 of the rectifier due to the received first RF wave 870 having the first optimum phase value ($\Phi_o$, 1). The wireless power reception device 150 and 160 may identify the number of times the optimum phase value $\Phi_o$ has been calculated up to that point in time based on an increase in the average of rectifier output voltage values. Further, the processor 155 may increase a preset voltage value according to the number of the calculations based on the increase in the average, thereby improving the speed of calculation. For example, the processor 155 may adjust the preset voltage value to be higher in an operation of calculating the second optimum phase value ($\Phi_o$, 2) than in an operation of calculating the first optimum phase value ($\Phi_o$, 1). In the operation of calculating the second optimum phase value ($\Phi_o$, 2), the processor 155 may identify rectifier output voltage values of the preset voltage value, which has been adjusted to be higher, and may perform calculation on the identified rectifier voltage values, thereby increasing the speed of calculation.

Referring to FIG. 10, the wireless power transmission device 100 may receive a communication signal including the second optimum phase value ($\Phi_o$, 2) from the wireless power reception device 150 and 160 in operation 1011 may store the second optimum phase value ($\Phi_o$, 2), and may configure the phase of a sub-RF wave formed on the third antenna 113 as the second optimum phase value ($\Phi_o$, 2) in operation 1012.

During the operation of the wireless power transmission device 100 calculating the optimum phase value $\Phi_o$, an RF wave received by the wireless power reception device 150 and 160 may be received in a form in which sub-RF waves from the respective antennas are accumulated. For example, referring to FIG. 10, in operation 1012, the wireless power reception device 150 and 160 may receive, from the wireless power transmission device 100, a third RF wave formed based on the sub-RF wave 850 formed on the first antenna 111 of the wireless power transmission device 100, the sub-RF wave formed on the second antenna 112 and having the first optimum phase value ($\Phi_o$, 1), and the sub-RF wave formed on the third antenna 113 and having the second optimum phase value ($\Phi_o$, 2). That is, as the operation for the optimum phase value $\Phi_o$ is repeated, the amount of charging based on RF waves received during the operation of calculating the optimum phase value $\Phi_o$ may increase. For example, the wireless power reception device 150 and 160 may be charged by a first charging amount for a certain period based on the sub-RF wave 850 from the first antenna 111 and the sub-RF wave having the first optimum phase value ($\Phi_o$, 1) from the second antenna 112 during calculation of the second optimum phase value ($\Phi_o$, 2), and may be charged by a second charging amount for a certain period based on the sub-RF wave 850 from the first antenna 111, the sub-RF wave having the first optimum phase value ($\Phi_o$, 1)

from the second antenna 112, and the sub-RF wave having the second optimum phase value ($\Phi_o$, 2) from the third antenna 113 during calculation of a third optimum phase value ($\Phi_o$, 3) from a fourth antenna, where the second charging amount may be greater than the first charging amount. Due to an operation in which RF waves received by the wireless power reception device 150 and 160 are accumulated, the charging time of the wireless power reception device 150 and 160 may be reduced. For example, as described above, since the wireless power reception device 150 and 160 can be continuously charged by RF waves formed in the respective antennas while the respective phases of the plurality of antennas of the wireless power transmission device 100 are configured, rather than receiving RF waves from the wireless power transmission device 100 after the respective phases of the plurality of antennas of the wireless power transmission device 100 are configured, the time taken to fully charge the wireless power reception device 150 and 160 may be reduced.

Referring to FIG. 10, after calculating the second optimum phase value ($\Phi_o$, 2), the wireless power reception device 150 and 160 may continue to calculate the optimum phase value $\Phi_o$ of each remaining antenna of the plurality of power transmission antennas 111 to 126 of the wireless power transmission device 100, and may provide a communication signal including information about the calculated optimum phase value to the wireless power transmission device 100 in operation 1013. Upon receiving the communication signal including the optimum phase value $\Phi_o$ of each remaining antenna of the plurality of power transmission antennas 111 to 126, the wireless power transmission device 100 may continue to configure the optimum phase value $\Phi_o$ of an RF wave formed on each remaining antenna of the at least one or more power transmission antennas 111 to 126. Accordingly, the wireless power reception device 150 and 160 may receive an RF wave 1080 formed based on sub-RF waves having the optimum phase value $\Phi_o$ formed on each of the at least one or more power transmission antennas 111 to 126.

As a result, as shown in FIG. 11, the RF wave formed on each remaining antenna of the plurality of power transmission antennas 111 to 126 of the wireless power transmission device 100 may be directed to the wireless power reception device 150 and 160, thus enabling optimal wireless charging of the wireless power reception device 150 and 160.

The wireless power transmission device 100 and the wireless power reception device 150 and 160 may perform a greater or smaller number of operations than operation 901 to operation 905, and are not limited to the foregoing description. Further, operation 901 to operation 905 may be performed in various orders, and are not limited to the described order.

Hereinafter, various embodiments of the operation of the wireless power reception device 150 and 160 will be described.

Figure 12:
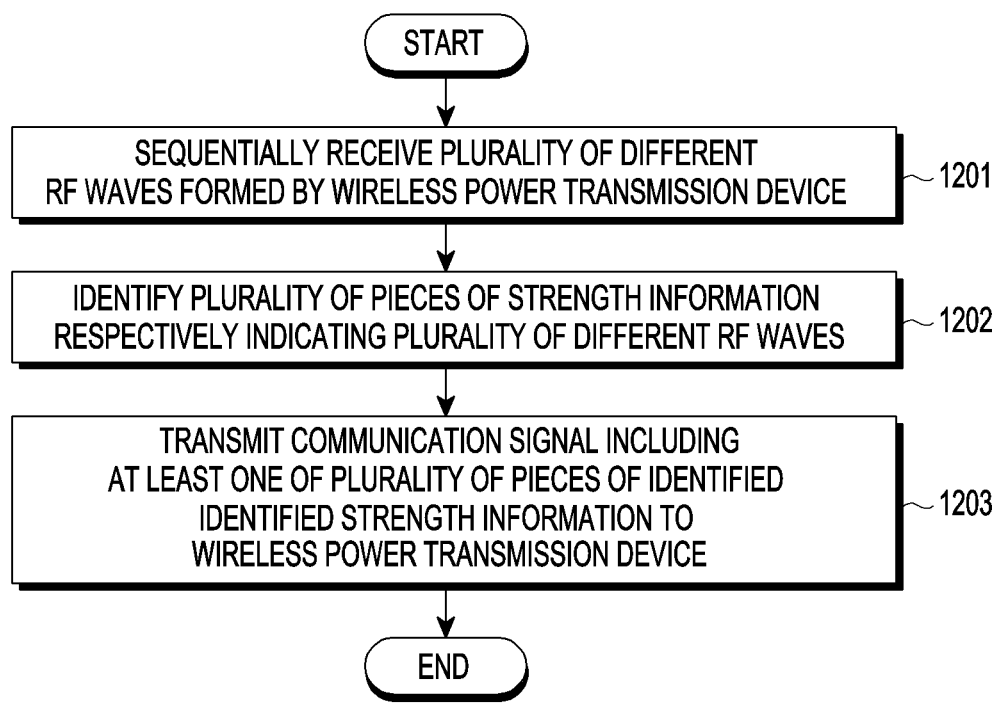
FIG. 12 is a flowchart illustrating various embodiments of the operation of a wireless power reception device according to various embodiments.

FIG. 12 is a flowchart illustrating various embodiments of the operation of the wireless power reception device 150 and 160 according to various embodiments.

Figure 13:
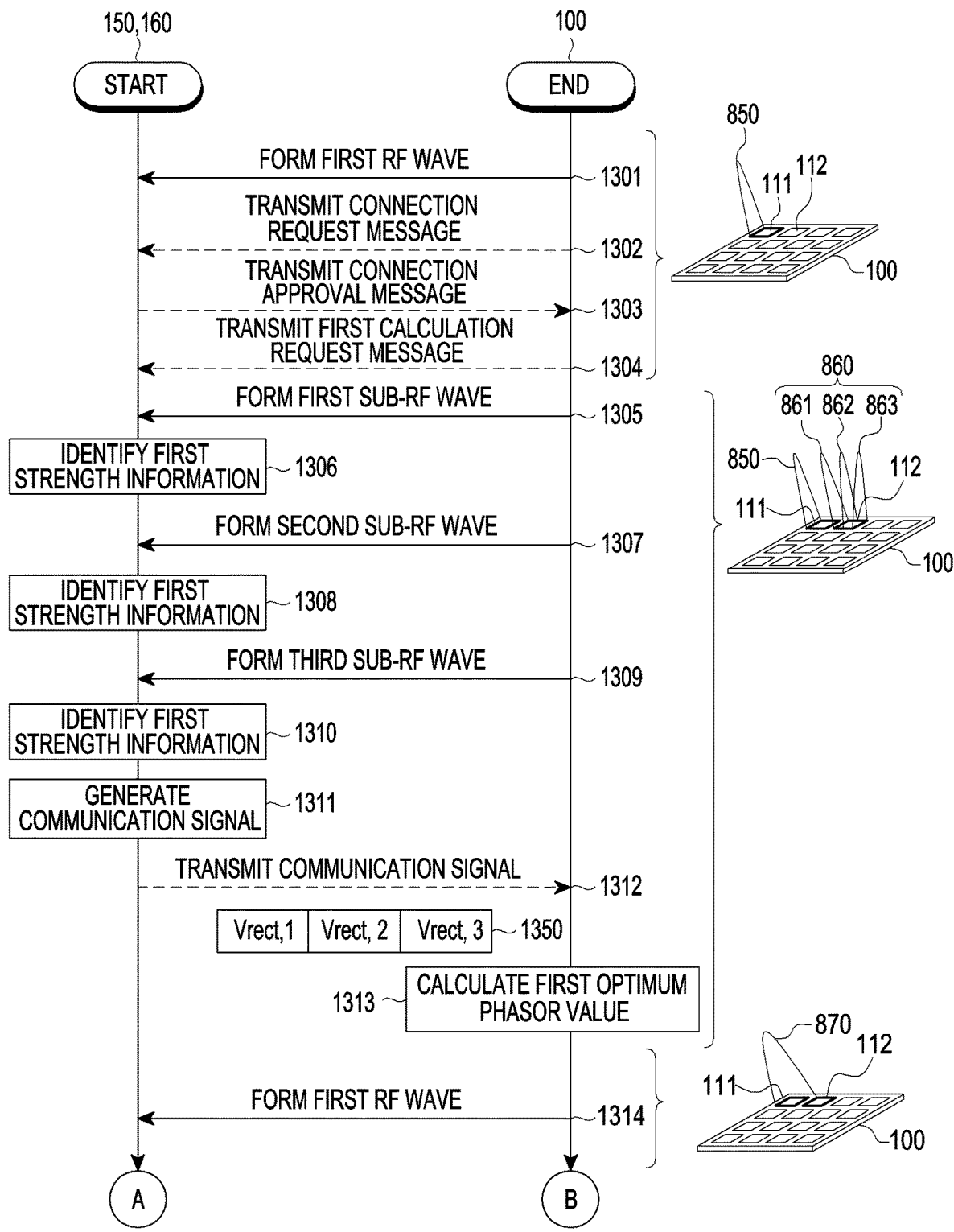
FIG. 13 is a flowchart illustrating data exchange between a wireless power reception device and a wireless power transmission device and formation of an RF wave by a wireless power transmission device according to various embodiments.

FIG. 13 is a flowchart illustrating data exchange between the wireless power reception device 150 and 160 and the wireless power transmission device 100 and formation of an RF wave by the wireless power transmission device 100 according to various embodiments.

As described above, FIG. 13 shows that a first antenna 111 forms a sub-RF wave 850 having directivity and a second antenna 112 forms sub-RF waves 861, 862 and 863, which is only for illustrative purposes. For example, the sub-RF waves 861, 862, and 863 are divided to visually show a phase difference, and it will be easily understood by those skilled in the art that the individual antennas 111 and 112 form sub-RF waves having different phases. The RF wave 870 shown in FIG. 13 is a visual representation of a directional RF wave 870 being formed according to interference by at least one of the sub-RF wave 850 and the sub-RF waves 861, 862, and 863.

Hereinafter, various embodiments of the disclosure will be described with reference to FIG. 12 and FIG. 13. The embodiment of FIG. 12 will be described in detail with reference to FIG. 13.

Referring to FIG. 12, in operation 1201, the wireless power reception device 150 and 160 may sequentially receive a plurality of different RF waves formed from the wireless power transmission device 100. Since operation 1201 may be performed in the same manner as operation 401, a redundant description thereof will be omitted. Further, since operation 1301 to operation 1305 shown in FIG. 13 may be performed in the same manner as operation 801 to operation 805, operation 1305 may be performed in the same manner as operation 805, operation 1306 may be performed in the same manner as operation 806, and operation 1309 may be performed in the same manner as operation 809, redundant descriptions thereof will be omitted.

Referring to FIG. 12, in operation 1202, the wireless power reception device 150 and 160 (e.g., the processor 155) may identify a plurality of pieces of strength information respectively indicating the strengths of the plurality of different RF waves. Since operation 1202 may be performed in the same manner as operation 402, a redundant description thereof will be omitted. Operation 1306, operation 1308, and operation 1310 shown in FIG. 13 may be performed in the same manner as operation 806, operation 808, and operation 810, respectively. For example, the wireless power reception device 150 and 160 may identify a first rectifier output voltage value (Vrect, 1) formed corresponding to a first sub-RF wave 861, a second rectifier output voltage value (Vrect, 2) formed corresponding to a second sub-RF wave 862, and a third rectifier output voltage value (Vrect, 3) formed corresponding to a third sub-RF wave 863 in response to the plurality of different RF waves formed based on the first sub-RF wave 861 to the third sub-RF wave 833. A redundant description of the operation of identifying the strength information will be omitted.

Referring to FIG. 12, in operation 1203, the wireless power reception device 150 and 160 (e.g., the processor 155) may transmit a communication signal including the plurality of pieces of identified strength information to the wireless power transmission device 100 through the communication circuit 157. For example, referring to FIG. 13, the wireless power transmission device 100 may generate a communication signal including the identified first to third rectifier output voltage values (Vrect, 1 to 3) in operation 1311, and may transmit the communication signal to the wireless power reception device 150 and 160 in operation 1312. The communication signal may allow a plurality of different RF waves or a plurality of sub-RF waves 860 corresponding to respective ones among the plurality of rectifier output voltage values (Vrect, 1 to 3) to be identified by the wireless power transmission device 100. For example, the communication signal may include identification information indicating the formation order of the rectifier output voltage values (Vrect, 1 to 3) in addition to the plurality of rectifier output voltage values (Vrect, 1 to 3). The wireless power transmission device 100 may match the plurality of received rectifier output voltage values (Vrect, 1 to 3), identification information about the plurality of received rectifier output voltage values (Vrect, 1 to 3), and the formation order of the plurality of different sub-RF waves 860, thereby identifying the plurality of rectifier output voltage values (Vrect, 1 to 3) and the plurality of different sub-RF waves corresponding thereto. Referring to FIG. 13, in operation 1313, the wireless power transmission device 100 may calculate a first optimum phasor value ($\Phi_o$, 1) upon receiving the communication signal including the plurality of pieces of strength information. For example, the wireless power transmission device 100 may identify the first to third phases ($\Phi_o$, 1 to 3) of the respective first to third sub-RF waves 861 to 863 sequentially formed on the second antenna 112, may identify the rectifier output voltage values corresponding to respective ones among the first to third sub-RF waves 863 among the plurality of rectifier output voltage values (Vrect, 1 to 3), and may calculate the first optimum phase value ($\Phi_o$, 1) based on the identified phases (first to third phases) and the rectifier output voltage values corresponding thereto. This calculation may be performed by at least one method of interpolation, extrapolation, or cutting graphing. A redundant description of the calculation will be omitted. Alternatively, the wireless power transmission device 100 may select the phase of the sub-RF wave having the maximum rectifier output voltage value among the plurality of received rectifier output voltages as the first optimum phase value ($\Phi_o$, 1).

Alternatively, in operation 1312, the wireless power reception device 150 and 160 (e.g., the processor 155) may transmit a communication signal including significant rectifier output voltage values for calculating the first optimum phasor value ($\Phi_o$, 1), among the plurality of rectifier output voltage values (Vrect, 1 to 3), to the wireless power transmission device 100. For example, the wireless power reception device 150 and 160 may identify rectifier output voltage values equal to or greater than a preset voltage value among the plurality of rectifier output voltage values (Vrect, 1 to 3), and may transmit a communication signal including the identified rectifier output voltage values to the wireless power transmission device 100. Here, the wireless power reception device 150 and 160 may further include identification information for identifying each rectifier output voltage value included in the communication signal. For example, the wireless power reception device 150 and 160 may further include, in the communication signal, identification information for identifying an RF wave corresponding to the identified rectifier output voltage value, among the plurality of different RF waves 860 received from the wireless power transmission device 100. As described above, the identification information may be generated by the wireless power reception device 150 and 160 (e.g., the processor 155) based on a change in the rectifier output voltage values (Vrect, 1 to 3), and may be assigned for each rectifier output voltage value. A redundant description of generation of the identification information will be omitted. Accordingly, in operation 1313, the wireless power transmission device 100 may calculate the first optimum phase value ($\Phi_o$, 1) based on the transmitted significant rectifier output voltage values, the identification information, and the phase of each of the plurality of different RF waves 860 that can be identified by the wireless power transmission device 100.

Alternatively, in operation 1312, the wireless power reception device 150 and 160 may transmit a communication signal including only identification information for selecting the first optimum phasor value. For example, the wireless power reception device 150 and 160 may identify the rectifier output voltage value having the highest strength among the rectifier output voltage values (Vrect, 1 to 3) and may transmit a communication signal including identification information corresponding to the identified rectifier output voltage value to the wireless power transmission device 100. In operation 1313, the wireless power transmission device 100 may identify the phase of a sub-RF wave corresponding to the received identification information among the plurality of different RF waves 860 and may identify the identified phase as the first optimum phase value ($\Phi_o$, 1). Because the wireless power transmission device 100 transmits the communication signal including the identification information, the wireless power reception device 150 and 160 does not need to perform an operation of calculating the optimum phase value, thus reducing the amount of time taken for the wireless power reception device 150 and 160 to configure the optimum phase value.

Referring to FIG. 13, as a result, in operation 1314, the wireless power transmission device 100 may form a first RF wave 870 having the calculated first optimum phase value ($\Phi_o$, 1) on the second antenna 112.

The wireless power transmission device 100 and the wireless power reception device 150 and 160 may perform a greater or smaller number of operations than operation 1201 to operation 1203, and are not limited to the foregoing description. Further, operation 1201 to operation 1203 may be performed in various orders, and are not limited to the described order.

Hereinafter, various embodiments of an operation of exchanging phase information between the wireless power transmission device 100 and the wireless power reception device 150 and 160 will be described.

Figure 14:
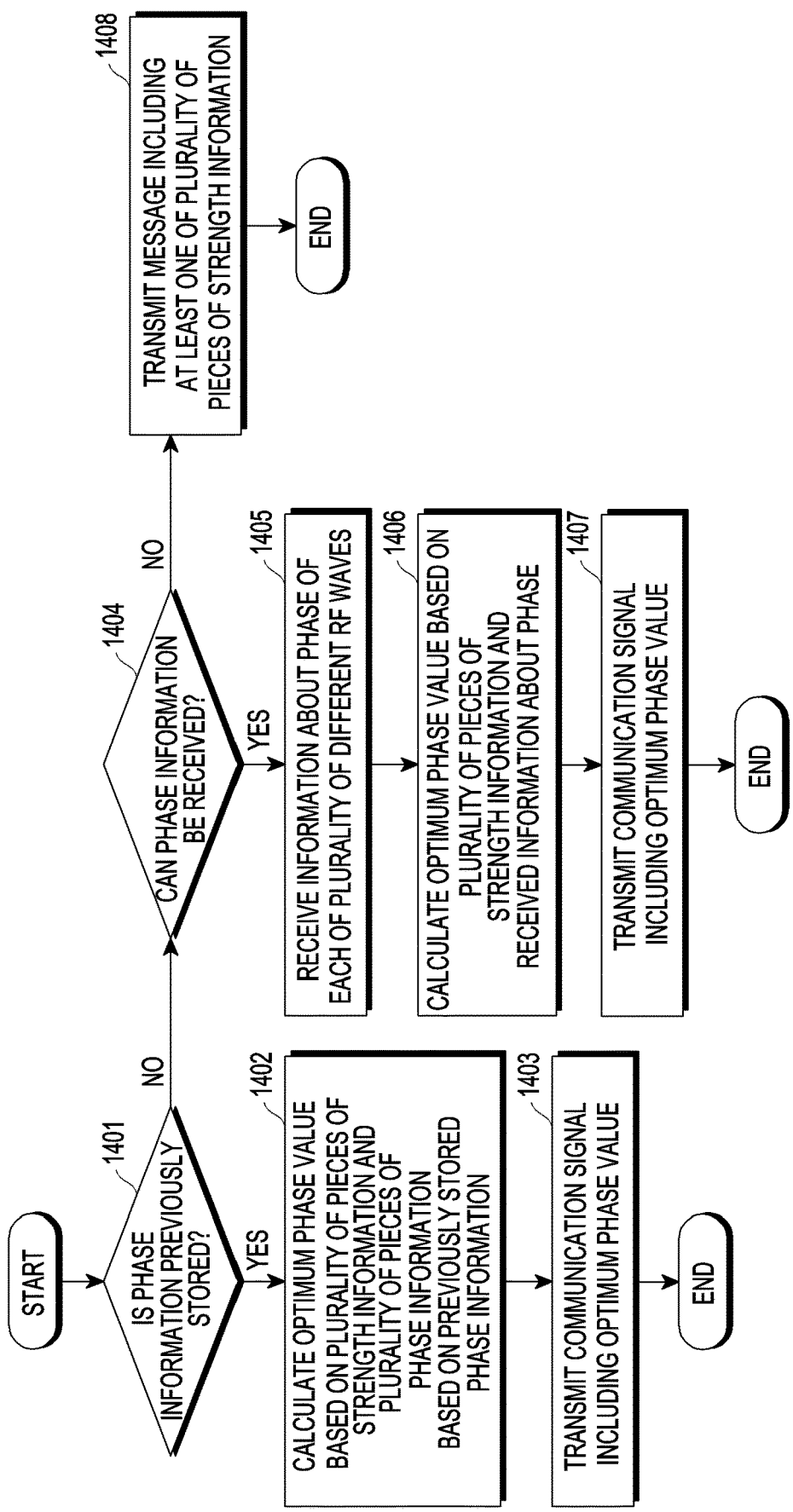
FIG. 14 is a flowchart illustrating an optimum phase calculation operation of a wireless power reception device depending on whether phase information is previously stored according to various embodiments.

FIG. 14 is a flowchart illustrating an optimum phase calculation operation of the wireless power reception device 150 and 160 depending on whether phase information is previously stored according to various embodiments.

Figure 15:
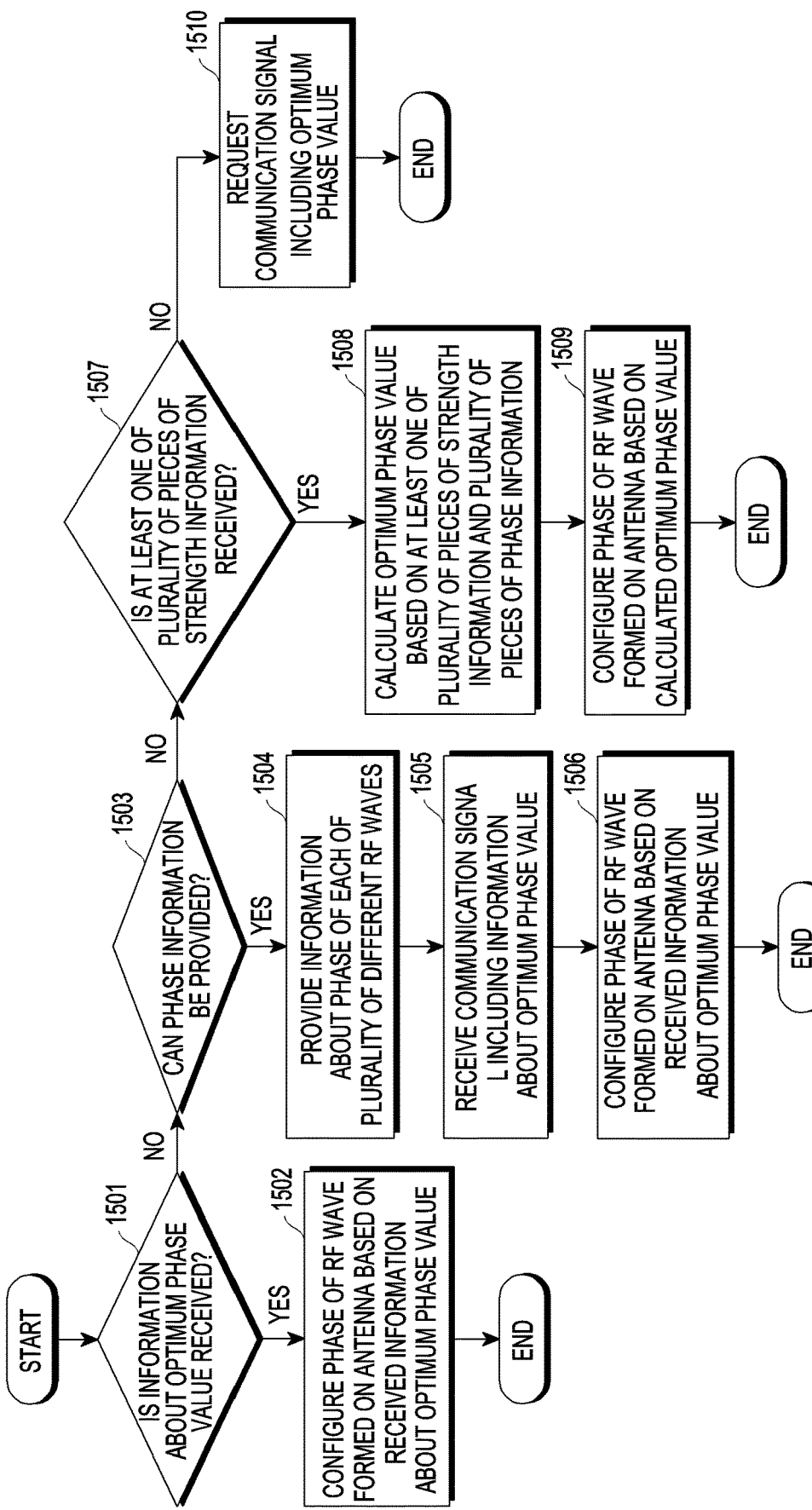
FIG. 15 is a flowchart illustrating a phase configuration operation of a wireless power transmission device depending on whether information about an optimum phase value is received according to various embodiments.

FIG. 15 is a flowchart illustrating a phase configuration operation of the wireless power transmission device 100 depending on whether information about an optimum phase value $\Phi_o$ is received according to various embodiments.

Figure 16A:
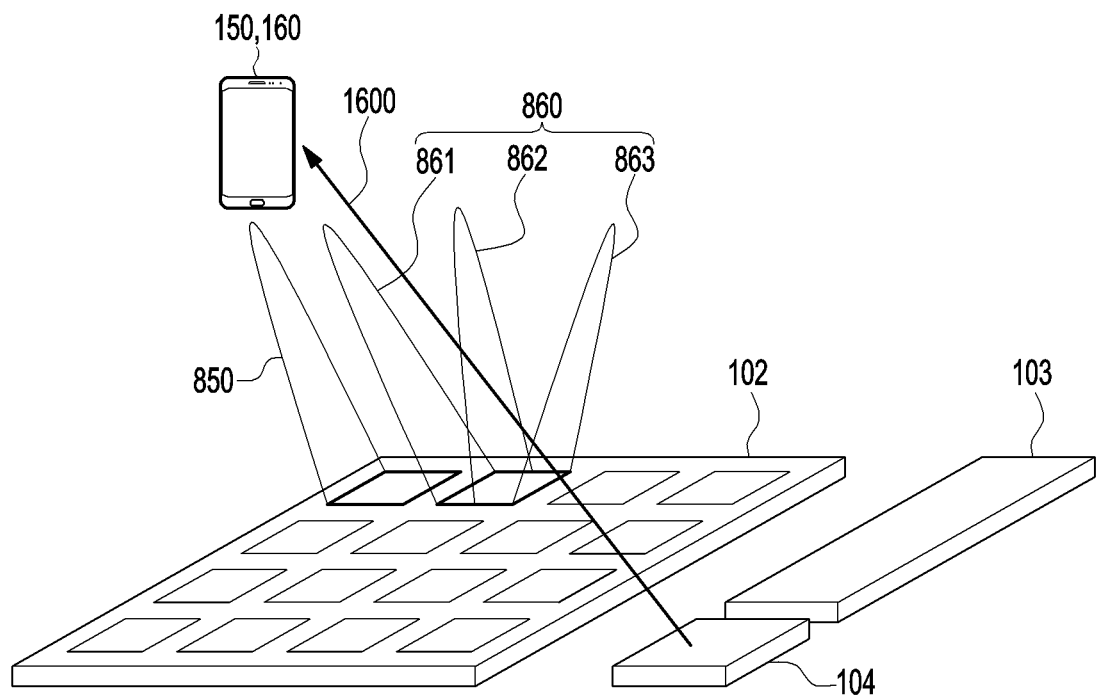
FIG. 16A illustrates an operation of a wireless power transmission device transmitting phase information to a wireless power reception device according to various embodiments.
Figure 16B:
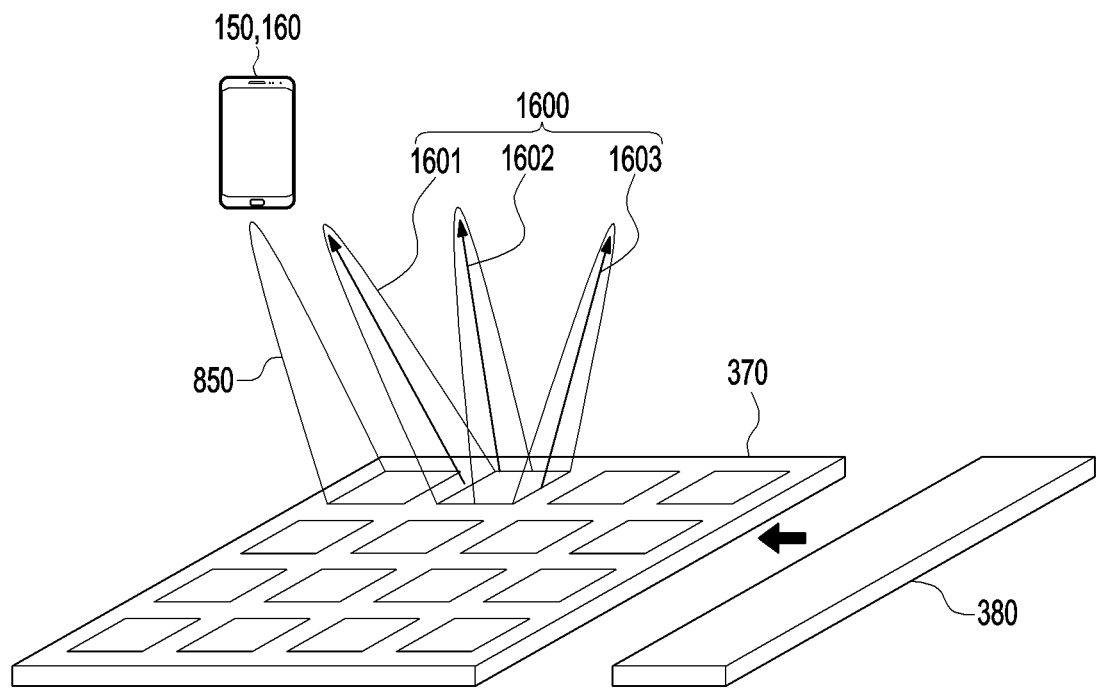
FIG. 16B illustrates an operation of a wireless power transmission device transmitting phase information to a wireless power reception device according to various embodiments.

FIG. 16A illustrates an operation of the wireless power transmission device 100 transmitting phase information to the wireless power reception device 150 and 160 according to various embodiments. FIG. 16B illustrates an operation of a wireless power transmission device transmitting phase information to a wireless power reception device according to various embodiments.

FIG. 16A shows that one antenna forms a sub-RF wave 850 having directivity and a different antenna forms sub-RF waves 861, 862, and 863, but this is only for illustrative purposes. For example, the sub-RF waves 861, 862, and 863 are divided to visually show a phase difference, and it will be easily understood by those skilled in the art that the individual antennas 111 and 112 form sub-RF waves having different phases. In FIG. 16B, 1601 to 1603 are illustrated to visually indicate that each of the sub-RF waves 861, 862, and 863 may include information for convenience of description.

Hereinafter, various embodiments will be described with reference to FIG. 14 to FIG. 16. Embodiments of FIG. 14 and FIG. 15 will be described in detail with reference to FIG. 16.

Referring to FIG. 14, in operation 1401, the wireless power reception device 150 and 160 may identify whether there is phase information previously stored in the memory 156. As described above, the phase information may be at least one of system information including random number generation information about the wireless power transmission device 100 or phase configuration information about the wireless power transmission device 100. When it is determined that there is phase information previously stored in the memory 156, the wireless power reception device 150 and 160 may calculate an optimum phase value $\Phi_o$ based on a plurality of pieces of strength information and a plurality of pieces of phase information based on the previously stored phase information in operation 1402, and may transmit a communication signal including the optimum phase value $\Phi_o$ in operation 1403. Since operation 1402 and operation 1403 may be performed in the same manner as operation 404 and operation 405, respectively, a redundant description thereof will be omitted.

Referring to FIG. 14, when it is determined that there is no phase information previously stored in the memory, the wireless power reception device 150 and 160 may identify whether phase information can be received from the wireless power transmission device 100 in operation 1404. When it is determined that the phase information can be received from the wireless power transmission device 100, the wireless power reception device 150 and 160 may receive information about the phase of each of a plurality of different RF waves in operation 1405. Alternatively, the wireless power reception device 150 and 160 may receive the system information including the random number generation information from the wireless power transmission device 100. Referring to FIG. 16, when the wireless power reception device 150 and 160 receives the phase information from the wireless power transmission device 100, the wireless power reception device 150 and 160 may receive a communication signal including the phase information from the communication circuit 104 of the wireless power transmission device 100, or may receive the phase information through at least one of a plurality of different RF waves formed in the power transmission antenna array 102 of the wireless power transmission device 100. For example, as shown in FIG. 16A, the communication circuit 157 of the wireless power reception device 150 and 160 may receive a second message including the phase information through the communication circuit 104 of the wireless power transmission device 100. In another example, as shown in FIG. 16B, when the wireless power transmission device 100 is configured as shown in FIG. 3, the wireless power reception device 150 and 160 may receive phase information included in at least one of a plurality of different RF waves formed in one antenna of the wireless power transmission device 100. For example, a first sub-RF wave 861 may include information 1601 about a phase configured in the first sub-RF wave, a second sub-RF wave 862 may include information 1602 about a phase configured in the second sub-RF wave, and a third sub-RF wave 863 may include information 1603 about a phase configured in the third sub-RF wave. After the phase information is received, the wireless power reception device 150 and 160 may calculate an optimum phase value $\Phi_o$ based on the plurality of pieces of strength information and the received phase information in operation 1406, and may transmit a communication signal including the optimum phase value $\Phi_o$ in operation 1407, a redundant description of which will be omitted.

Referring to FIG. 14, when it is determined that the phase information cannot be received from the wireless power transmission device 100, the wireless power reception device 150 and 160 may transmit a communication signal including at least one of the plurality of pieces of identified strength information to the wireless power transmission device 100 in operation 1408. The wireless power transmission device 100 may calculate an optimum phase value $\Phi_o$ based on a plurality of pieces of received strength information. Since operation 1408 may be performed in the same manner as operation 1311 to operation 1313, a redundant description thereof will be omitted.

The wireless power reception device 150 and 160 may perform a greater or smaller number of operations than operation 1401 to operation 1408, and are not limited to the foregoing description. Further, operation 1401 to operation 1408 may be performed in various orders and are not limited to the described order.

The wireless power transmission device 100 may perform an operation corresponding to the optimum phase calculation operation of the wireless power reception device 150 and 160 depending on whether phase information is previously stored.

Referring to FIG. 15, the wireless power transmission device 100 may identify whether information about an optimum phase value $\Phi_o$ is received in operation 1501. When receiving the information about the optimum phase value $\Phi_o$, the wireless power transmission device 100 may configure the phase of an RF wave formed on one antenna as the optimum phase value $\Phi_o$ based on the received information about the optimum phase value $\Phi_o$ in operation 1502, a redundant description of which will be omitted.

Referring to FIG. 15, when the information about the optimum phase value $\Phi_o$ is not received, the wireless power transmission device 100 may identify whether the wireless power transmission device 100 can provide phase information to the wireless power reception device 150 and 160 in operation 1503. When it is determined that the wireless power transmission device 100 can provide phase information, the wireless power transmission device 100 may transmit phase information about each of a plurality of different RF waves to the wireless power reception device 150 and 160 in operation 1504. Referring to FIG. 16, as described above, the operation of the wireless power transmission device 100 providing the phase information to the wireless power reception device 150 and 160 may be performed using the communication circuit 104 or at least one of the plurality of different RF waves. Upon transmitting the phase information to the wireless power reception device 150 and 160, the wireless power transmission device 100 may receive a communication signal including the information about the optimum phase value $\Phi_o$ in operation 1505 and may configure the phase of a sub-RF wave formed on one antenna as the optimum phase value $\Phi_o$ based on the received information about the optimum phase value $\Phi_o$ in operation 1506.

When it is determined that the wireless power transmission device 100 cannot provide phase information, the wireless power transmission device 100 may identify whether at least one of a plurality of pieces of strength information is received from the wireless power reception device 150 and 160 in operation 1507. When the at least one of the plurality of pieces of strength information is received, the wireless power transmission device 100 may calculate an optimum phase value $\Phi_o$ based on the at least one of the plurality of pieces of information and a plurality of pieces of phase information in operation 1508 and may configure the phase of a sub-RF wave formed on one antenna as the optimum phase value $\Phi_o$ based on the calculated optimum phase value $\Phi_o$ in operation 1509. A redundant description of an operation of the wireless power transmission device 100 identifying the optimum phase value $\Phi_o$ using the plurality of pieces of received strength information will be omitted.

When it is determined that at least one of the plurality of pieces of strength information is not received, the wireless power transmission device 100 may transmit a message requesting a communication signal including the optimum phase value $\Phi_o$ to the wireless power reception device 150 and 160 in operation 1509. Alternatively, the wireless power transmission device 100 may transmit a message requesting a communication signal including at least one of the plurality of pieces of strength information to the wireless power reception device 150 and 160 in operation 1510. When the wireless power transmission device 100 receives the communication signal in response to the message, the wireless power transmission device 100 may perform an operation corresponding to the communication signal.

The wireless power transmission device 100 may perform a greater or smaller number of operations than operation 1501 to operation 1510, and are not limited to the foregoing description. Further, operation 1501 to operation 1510 may be performed in various orders, and are not limited to the described order.

According to various embodiments, a wireless power reception device may include: at least one power reception antenna configured to sequentially receive a plurality of different RF waves formed by a wireless power transmission device; a communication circuit; and at least one processor, wherein the at least one processor may be configured to: identify a plurality of pieces of strength information indicating respective strengths of the plurality of different RF waves; identify a plurality of pieces of phase information corresponding to respective ones among the plurality of different RF waves; identify, based on the plurality of pieces of strength information and the plurality of pieces of phase information, an optimum phase value allowing a received RF wave to have a maximum strength; and transmit a communication signal including information about the optimum phase value to the wireless power transmission device through the communication circuit.

According to various embodiments, in the wireless power reception device, the at least one power reception antenna may receive the plurality of different RF waves formed based on a sub-RF wave formed on a first antenna among a plurality of power transmission antennas of the wireless power transmission device and sub-RF waves sequentially formed on a second antenna among the plurality of power transmission antennas for a certain period in at least part of an operation of sequentially receiving the plurality of different RF waves, and the at least one processor may be further configured to identify a plurality of pieces of strength information indicating respective strengths of the plurality of different RF waves received from the second antennas in at least part of an operation of identifying the plurality of pieces of strength information.

According to various embodiments, in the wireless power reception device, the at least one power reception antenna may receive a first RF wave formed based on a sub-RF wave having the optimum phase value by the second antenna in response to the at least one processor transmitting the communication signal including the information about the optimum phase value to the wireless power transmission device through the communication circuit.

According to various embodiments, in the wireless power reception device, after the at least one processor transmits the communication signal including the information about the optimum phase value through the communication circuit, the at least one power reception antenna may receive a plurality of different second RF waves formed based on a plurality of different sub-RF waves by a third antenna among the plurality of antennas while continuously receiving the first RF wave, and the at least one processor may be further configured to: identify a plurality of pieces of second strength information indicating respective strengths of the plurality of different second RF waves; identify a plurality of pieces of second phase information corresponding to respective ones among the plurality of different second RF waves; identify a second optimum phase value, which allows an RF wave received from the third antenna to have a maximum strength based on the plurality of pieces of second strength information and the plurality of pieces of second phase information; and transmit a second communication signal including information about the second optimum phase value to the wireless power transmission device through the communication circuit.

According to various embodiments, in the wireless power reception device, the at least one power reception antenna may receive a third RF wave formed based on a sub-RF wave having the second optimum phase value from the third antenna in response to the transmitted second communication signal while receiving the first RF wave from the first antenna and receiving the RF wave having the optimum phase value from the second antenna.

According to various embodiments, in the wireless power reception device, the at least one processor may be further configured to: receive a first calculation request message from the wireless power transmission device through the communication circuit before receiving the plurality of different RF waves from the second antenna; and identify the plurality of pieces of strength information and the optimum phase value in response to the received first calculation request message, and a communication connection between the wireless power reception device and the wireless power transmission device may be maintained based on the first calculation request message.

According to various embodiments, in the wireless power reception device, the at least one processor may identify a plurality of voltage values corresponding to the respective ones among the plurality of different RF waves in at least part of an operation of identifying the plurality of pieces of strength information respectively indicating the strengths of the plurality of different RF waves, and the plurality of voltage values may be voltage values of an output terminal of a rectifier of the wireless power reception device.

According to various embodiments, in the wireless power reception device, the plurality of voltage values may be different from each other.

According to various embodiments, in the wireless power reception device, the at least one processor may be further configured to identify a phase of a sub-RF wave forming each of the plurality of different RF waves based on previously stored first information about a phase of each of the plurality of different RF waves in at least part of an operation of identifying the plurality of pieces of phase information corresponding to the respective ones among the plurality of different RF waves.

According to various embodiments, in the wireless power reception device, the previously stored first information may include at least one of system information about the wireless power transmission device or phase configuration information about the wireless power transmission device.

According to various embodiments, in the wireless power reception device, the at least one processor may be further configured to receive the plurality of pieces of phase information corresponding to respective sub-RF waves of the plurality of different RF waves from the wireless power transmission device.

According to various embodiments, in the wireless power reception device, the at least one power reception antenna may receive at least one of the plurality of different RF waves including the plurality of pieces of phase information, or the at least one processor may be further configured to receive a second message including the plurality of pieces of phase information from the external device through the communication circuit.

According to various embodiments, a wireless power reception device may include: at least one power reception antenna configured to sequentially receive a plurality of different RF waves formed by a wireless power transmission device; a communication circuit; and at least one processor, wherein the at least one processor may be configured to: identify a plurality of pieces of strength information indicating respective strengths of the plurality of different RF waves; and transmit a communication signal including at least one of the plurality of pieces of identified strength information to the wireless power transmission device through the communication circuit.

According to various embodiments, in the wireless power reception device, the at least one power reception antenna may receive the plurality of different RF waves based on a sub-RF wave by a first antenna among a plurality of power transmission antennas of the wireless power transmission device and on the plurality of different sub-RF waves sequentially formed on a second antenna of the plurality of power transmission antennas for a certain period in at least part of an operation of sequentially receiving the plurality of different RF waves, and the at least one processor may be further configured to identify a plurality of pieces of strength information indicating respective strengths of the plurality of different RF waves received from the second antennas in at least part of an operation of identifying the plurality of pieces of strength information.

According to various embodiments, in the wireless power reception device, the at least one processor may be further configured to identify a plurality of pieces of phase information corresponding to respective ones among the plurality of different RF waves, and may be further configured to identify strength information about at least one of the plurality of different RF waves which allows a received RF wave to have a maximum strength based on the plurality of pieces of strength information and the plurality of pieces of phase information and to transmit a first communication signal including the strength information to the wireless power transmission device through the communication circuit in at least part of an operation of transmitting the communication signal to the wireless power transmission device.

According to various embodiments, a wireless power transmission device may include: at least one power transmission antenna configured to sequentially transmit a plurality of different RF waves; a communication circuit; and at least one processor, wherein the at least one processor may be configured to receive a communication signal including information about an optimum phase value from a wireless power reception device through the communication circuit, and the optimum phase value may be identified based on a plurality of pieces of strength information indicating respective strengths of the plurality of different RF waves and a plurality of pieces of phase information corresponding to respective ones among the plurality of different RF waves, which are identified by the wireless power transmission device.

According to various embodiments, in the wireless power transmission device, the at least one power transmission antenna may form a reference sub-RF wave on a first antenna among the at least one power transmission antenna and may sequentially form a plurality of different sub-RF waves on a second antenna among the at least one power transmission antenna for a certain period in at least part of an operation of sequentially transmitting the plurality of different RF waves.

According to various embodiments, in the wireless power transmission device, the at least one power transmission antenna may form a sub-RF wave having the optimum phase value on the second antenna in response to the at least one processor receiving the communication signal including the information about the optimum phase value through the communication circuit.

According to various embodiments, in the wireless power transmission device, with the first antenna of the at least one power transmission antenna continuously forming the reference sub-RF wave and the second antenna forming the sub-RF wave having the optimum phase value, a third antenna among the plurality of antennas may form a plurality of different sub-RF waves, the at least one processor may be configured to receive a second communication signal including information about a second optimum phase value from the wireless power reception device through the communication circuit, and the second optimum phase value may be identified based on a plurality of pieces of second strength information indicating respective strengths of a plurality of different second RF waves and a plurality of pieces of second phase information corresponding to respective ones among the plurality of different second RF waves, which are identified by the wireless power reception device.

According to various embodiments, in the wireless power transmission device, with the first antenna of the at least one power transmission antenna forming the reference sub-RF wave and the second antenna forming the RF wave having the optimum phase value, the third antenna may form a sub-RF wave having the second optimum phase value in response to the received second communication signal.

According to various embodiments, in the wireless power transmission device, with the first antenna of the at least one power transmission antenna forming the reference sub-RF wave and the second antenna forming an RF wave having the optimum phase value, the third antenna may form a third RF wave having the second optimum phase value in response to the received second communication signal.

The embodiments disclosed herein have been presented to easily explain the technical contents of the disclosure and help understanding of the disclosure, and are not intended to limit the scope of the disclosure. Therefore, the scope of the disclosure should be construed to include all changes and modifications or various other embodiments derived on the basis of the technical idea of the disclosure.

The invention claimed is:

1. A wireless power reception device comprising:
at least one power reception antenna configured to sequentially receive a plurality of different RF waves formed by a wireless power transmission device;
a communication circuit; and
at least one processor,
wherein the at least one power reception antenna is configured to receive the plurality of different RF waves formed based on a sub-RF wave formed on a first antenna among a plurality of power transmission antennas of the wireless power transmission device and sub-RF waves sequentially formed on a second antenna among the plurality of power transmission antennas for a certain period in at least part of an operation of sequentially receiving the plurality of different RF waves, wherein the at least one processor is configured to:
- identify a plurality of pieces of strength information indicating respective strengths of the plurality of different RF waves,
- identify a plurality of pieces of phase information corresponding to respective ones among the plurality of different RF waves,
- identify, based on the plurality of pieces of strength information and the plurality of pieces of phase information, an optimum phase value which allows a received RF wave to have a maximum strength, and
- transmit a communication signal including information about the optimum phase value to the wireless power transmission device through the communication circuit, wherein the at least one power reception antenna is configured to receive a first RE wave formed based on a sub-RF wave having the optimum phase value formed by the second antenna in response to the at least one processor transmitting the communication signal including the information about the optimum phase value to the wireless power transmission device through the communication circuit, wherein, based on the at least one processor transmitting the communication signal including the information about the optimum phase value through the communication circuit, the at least one power reception antenna is configured to receive a plurality of different second RF waves formed based on a plurality of different sub-RF waves by a third antenna among the plurality of power transmission antennas while continuously receiving the first RF wave, wherein the at least one processor is further configured to:
- identify a plurality of pieces of second strength information indicating respective strengths of the plurality of different second RF waves,
- identify a plurality of pieces of second phase information corresponding to respective ones among the plurality of different second RF waves,
- identify a second optimum phase value which allows an RF wave received from the third antenna to have a maximum strength based on the plurality of pieces of second strength information and the plurality of pieces of second phase information, and
- transmit a second communication signal including information about the second optimum phase value to the wireless power transmission device through the communication circuit, and wherein the at least one power reception antenna is configured to receive a third RF wave formed based on a sub-RF wave having the second optimum phase value formed by the third antenna in response to the transmitted second communication signal while receiving the sub-RF wave from the first antenna and receiving the RF wave having the optimum phase value from the second antenna.

2. The wireless power reception device of claim 1, wherein
the at least one processor is further configured to:
- identify the plurality of pieces of strength information indicating respective strengths of the plurality of different RF waves received from the second antenna in at least part of an operation of identifying the plurality of pieces of strength information.

3. The wireless power reception device of claim 1, wherein the at least one processor is further configured to:
- receive a first calculation request message from the wireless power transmission device through the communication circuit before receiving the plurality of different RF waves from the second antenna; and
- identify the plurality of pieces of strength information and the optimum phase value in response to the received first calculation request message, and wherein a communication connection between the wireless power reception device and the wireless power transmission device is maintained based on the first calculation request message.

4. The wireless power reception device of claim 1, wherein the at least one processor is configured to identify a plurality of voltage values corresponding to respective ones among the plurality of different RF waves in at least part of an operation of identifying the plurality of pieces of strength information respectively indicating the strengths of the plurality of different RF waves, and
wherein the plurality of voltage values is voltage values of an output terminal of a rectifier of the wireless power reception device.

5. The wireless power reception device of claim 4, wherein the plurality of voltage values is different from each other.

6. The wireless power reception device of claim 1, wherein the at least one processor is further configured to identify a phase of a sub-RF wave forming each of the plurality of different RF waves based on previously stored first information about a phase of each of the plurality of different RF waves in at least part of an operation of identifying the plurality of pieces of phase information corresponding to the respective ones among the plurality of different RF waves.

7. The wireless power reception device of claim 6, wherein the previously stored first information comprises at least one of system information about the wireless power transmission device or phase configuration information about the wireless power transmission device.

8. The wireless power reception device of claim 1, wherein the at least one processor is further configured to receive the plurality of pieces of phase information corresponding to respective sub-RF waves of the plurality of different RF waves from the wireless power transmission device.

9. The wireless power reception device of claim 8, wherein the at least one power reception antenna is configured to receive at least one of the plurality of different RF waves including the plurality of pieces of phase information, or
the at least one processor is further configured to receive a second message including the plurality of pieces of phase information from the wireless power transmission device through the communication circuit.

10. A wireless power transmission device comprising:
at least one power transmission antenna configured to sequentially transmit a plurality of different RF waves;
a communication circuit; and
at least one processor,
wherein the at least one power transmission antenna is configured to form a reference sub-RF wave on a first antenna among the at least one power transmission antenna and sequentially form a plurality of different sub-RF waves on a second antenna among the at least one power transmission antenna for a certain period in at least part of an operation of sequentially transmitting the plurality of different RF waves, wherein the at least one processor is configured to receive a communication signal including information about an optimum phase value from a wireless power reception device through the communication circuit, wherein the optimum phase value is identified based on a plurality of pieces of strength information indicating respective strengths of the plurality of different RF waves and a plurality of pieces of phase information corresponding to respective ones among the plurality of different RF waves, which are identified by the wireless power reception device, wherein the at least one power transmission antenna is configured to form a sub-RF wave having the optimum phase value on the second antenna in response to the at least one processor receiving the communication signal including the information about the optimum phase value through the communication circuit, wherein the at least one power transmission antenna is configured to form a plurality of different sub-RF waves on a third antenna among the at least one power transmission antenna, while forming the reference sub-RF wave on the first antenna and forming the sub-RF wave having the optimum phase value on the second antenna, wherein the at least one processor is configured to receive a second communication signal including information about a second optimum phase value from the wireless power reception device through the communication circuit, wherein the second optimum phase value is identified based on a plurality of pieces of second strength information indicating respective strengths of a plurality of different second RF waves and a plurality of pieces of second phase information corresponding to respective ones among the plurality of different second RF waves, which are identified by the wireless power device, and wherein the at least one power transmission antenna is configured to form a sub-RF wave having the second optimum phase value on the third antenna in response to the at least one processor receiving the second communication signal including the information about the second optimum phase value through the communication circuit.

* * * * *